(12) United States Patent
Jablonski

(10) Patent No.: US 11,136,088 B2
(45) Date of Patent: Oct. 5, 2021

(54) ADAPTABLE CHILDREN'S BICYCLE

(71) Applicant: Krzysztof Jablonski, Englewood, CO (US)

(72) Inventor: Krzysztof Jablonski, Englewood, CO (US)

(73) Assignee: Krzysztof Jablonski, Englewood, CO (US)

( * ) Notice: Subject to any disclaimer, the term of this patent is extended or adjusted under 35 U.S.C. 154(b) by 322 days.

(21) Appl. No.: 16/439,671

(22) Filed: Jun. 12, 2019

(65) Prior Publication Data

US 2019/0382071 A1 Dec. 19, 2019

Related U.S. Application Data

(60) Provisional application No. 62/684,728, filed on Jun. 13, 2018.

(51) Int. Cl.
| | |
|---|---|
| *B62K 9/00* | (2006.01) |
| *B62K 19/32* | (2006.01) |
| *B62H 1/12* | (2006.01) |
| *B62M 3/08* | (2006.01) |
| *B62K 21/02* | (2006.01) |
| *B62M 3/16* | (2006.01) |
| *B62K 21/16* | (2006.01) |

(52) U.S. Cl.
CPC ............. *B62K 9/00* (2013.01); *B62H 1/12* (2013.01); *B62K 19/32* (2013.01); *B62K 21/16* (2013.01); *B62M 3/08* (2013.01); *B62M 3/16* (2013.01); *B62K 21/02* (2013.01); *B62K 2206/00* (2013.01)

(58) Field of Classification Search
CPC ........ B62K 19/32; B62K 21/02; B62K 21/16; B62K 2206/00; B62K 9/00; B62H 1/12; B62M 3/08
See application file for complete search history.

(56) References Cited

U.S. PATENT DOCUMENTS

| 5,154,096 | A | * | 10/1992 | Geller | ...................... | B62H 7/00 |
| | | | | | | 280/273 |
| 5,323,664 | A | * | 6/1994 | Fairfield | ................ | B62K 21/16 |
| | | | | | | 74/551.1 |
| 5,683,093 | A | * | 11/1997 | Hayes | ...................... | B62H 7/00 |
| | | | | | | 280/293 |
| 5,791,675 | A | * | 8/1998 | Fleischer | ................ | B62H 7/00 |
| | | | | | | 280/293 |
| 5,988,663 | A | * | 11/1999 | Starks | ...................... | B62H 7/00 |
| | | | | | | 280/293 |

(Continued)

*Primary Examiner* — Tony H Winner

(57) ABSTRACT

Examples of the present disclosure relate to a bicycle configured to easily and efficiently adapt for riders of different sizes while providing both balance bike and pedal bike functionality. An exemplary bicycle is a children's bicycle designed and developed to grow with a child. An exemplary bicycle is configured to enable utility adjustments to a front assembly, among other components, which creates a setup that comfortably accommodates either smaller riders or larger-sized riders. The bicycle is adjustable with minimal effort and without tools, enabling re-configuration on the fly. Further disclosed is an exemplary training wheel device that is attachable to an exemplary bicycle. An exemplary training wheel device extends functionality of the bicycle and assist with training a young child to ride the bicycle.

20 Claims, 19 Drawing Sheets

(56) References Cited

U.S. PATENT DOCUMENTS

| | | | | |
|---|---|---|---|---|
| 6,994,368 B2* | 2/2006 | Brown | ............... | B62H 1/12 |
| | | | | 280/288.4 |
| 7,296,813 B2* | 11/2007 | Montague | ............ | B62K 15/00 |
| | | | | 280/276 |
| 7,556,277 B2* | 7/2009 | Lytle | ............ | B62H 1/12 |
| | | | | 280/293 |
| 8,430,414 B1* | 4/2013 | Yap | ............... | B62K 15/008 |
| | | | | 280/278 |
| 9,079,634 B2* | 7/2015 | Stieger | ............... | B62M 6/55 |
| 10,569,823 B2* | 2/2020 | Nicol | ............ | B62K 21/12 |
| 2018/0001955 A1* | 1/2018 | Gahng | ............ | B62K 21/26 |
| 2020/0148302 A1* | 5/2020 | Gatto | ............ | B62M 3/08 |

\* cited by examiner

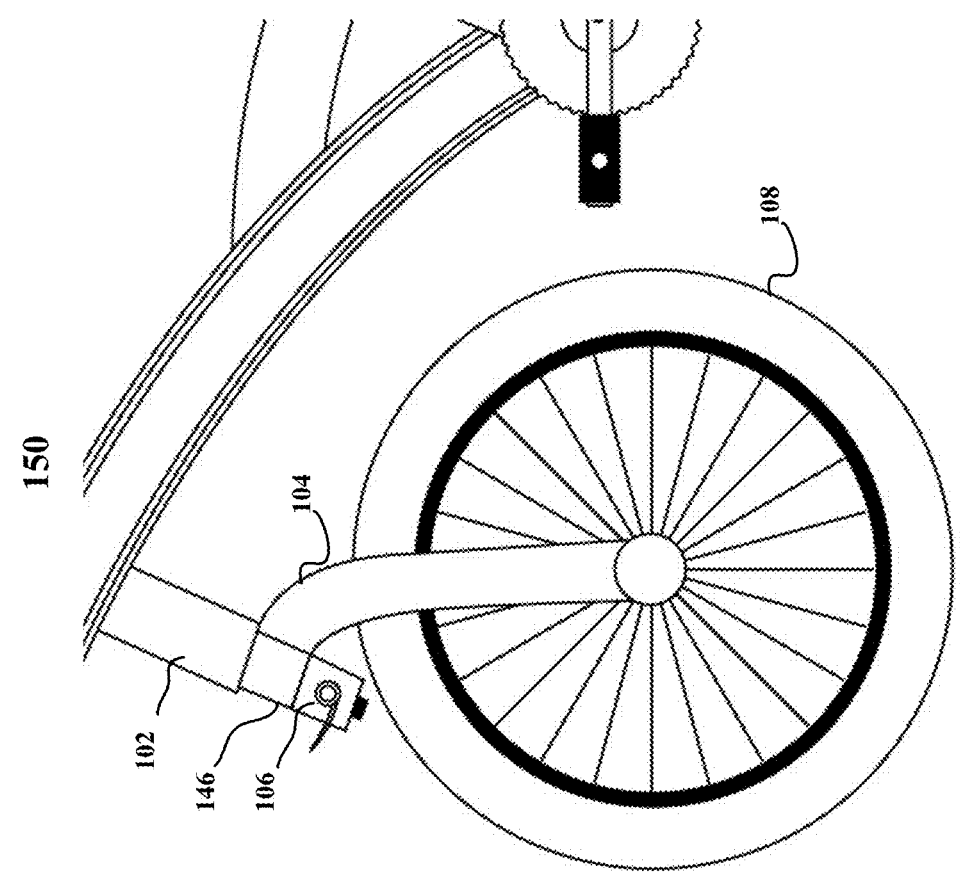

160

165

170

175

180

190

200

220

240

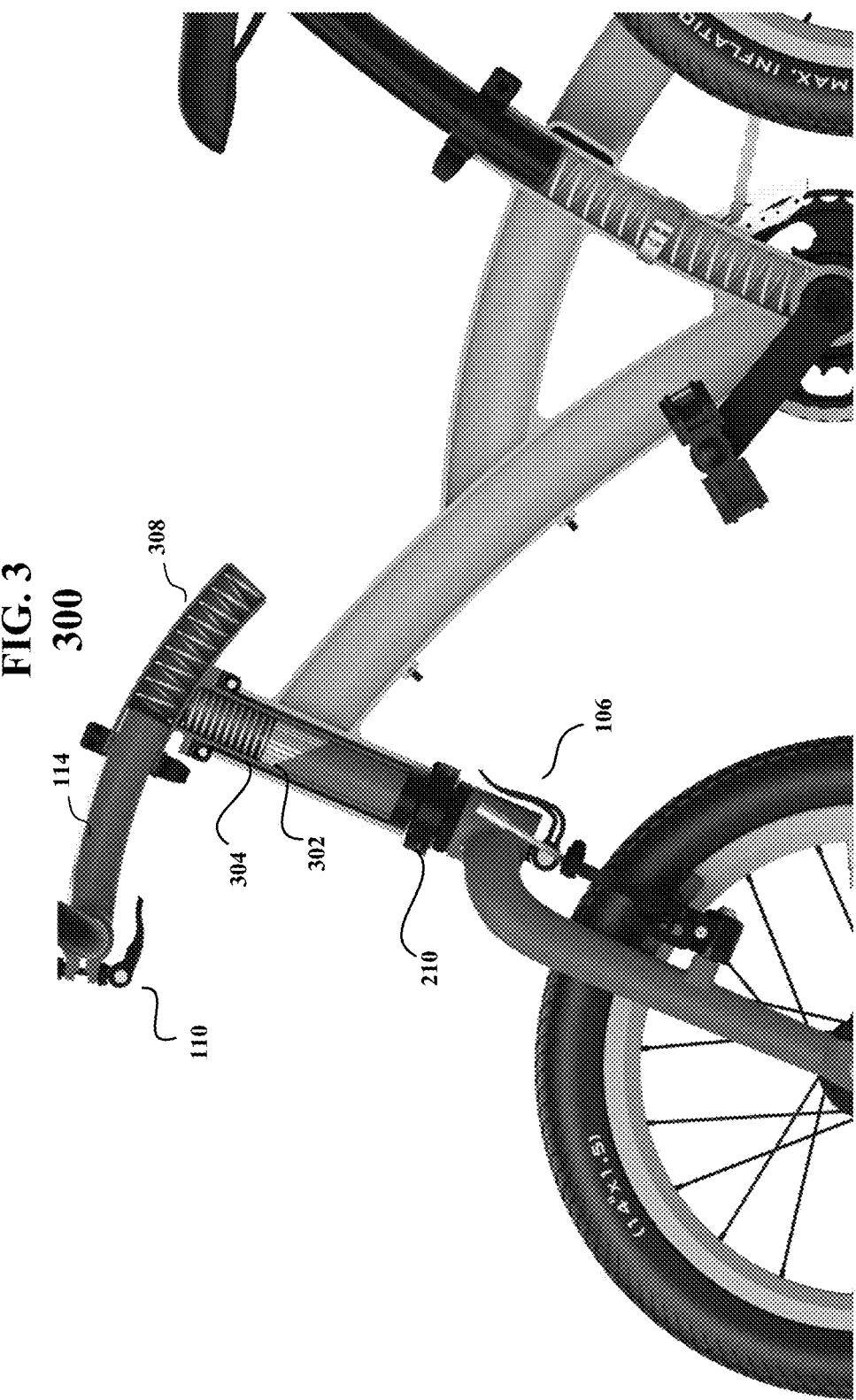

400

500

600

620

ADAPTABLE CHILDREN'S BICYCLE

CROSS-REFERENCE TO RELATED APPLICATIONS

This application claims priority to U.S. Provisional Application No. 62/684,728, filed Jun. 13, 2018 and titled "ADAPTABLE CHILDREN'S BICYCLE", which is hereby incorporated by reference herein in its entirety.

TECHNICAL FIELD

The present disclosure relates to a bicycle and associated components providing configurations that comfortably accommodate riders of different sizes. In specific non-limiting examples, the present disclosure relates to a bicycle for children that is usable to train the child to ride a bike as well as grow with the child as the child grows.

BACKGROUND

Riders of bicycles come in all different shapes and sizes. There is not a one-size-fits-all answer to accommodate riders of different sizes. Typically, bicycles are designed for riders of a specific size. Bicycle components such as the seat and the handlebars may be raised or lowered to help try and accommodate for riders of different sizes. This may work in instances where different riders are of a similar size or short-term instances where riders of different sizes are not using the same bicycle for years at a time. If the size between two riders varies greatly, typical bicycle configurations may be impractical for the rider or uncomfortable at the very least. A poor fitting bicycle may also feel less stable for the rider. For instance, a center of gravity of the rider is thrown off by a comprised positioning of a rider that tries to compensate for the poor fitting bicycle.

An example where size variance between bicycle riders is great is that where riders are younger children. From an early age, children grow rapidly. Consider an age range of 2 years old to 10 years old. As a single child grows, parents will have to buy multiple different bikes to accommodate for the child's growth, for example, buying a balance bike and then multiple standard pedal bicycles of various sizes. This is not only very costly but also requires management and maintenance of multiple bikes that parents will likely have to get rid of a few years later. Hybrid balance/pedal bikes exist to enable a young child rider to learn and grow with a bicycle. However, parents will still need to buy a new bicycle after several years due to limits in size and function. Larger-sized riders (e.g., older children) may have a lot of trouble with the size of such bikes, for example, where various components may not be designed to adjust in unison with a base of a bicycle. Additionally, such hybrid bikes are not as easily convertible on the fly, for example, when riders of different sizes are using the same bicycle.

Complicating matters, children typically still need training wheels to learn how to pedal a bicycle. As the child learns to ride faster with training wheels, parents may have trouble managing the speed of the bicycle without intervention. Trainers may attach a stick, pole, etc. to the back of the bicycle to be able to grab onto and slow the bicycle down. However, such rudimentary solutions may be limited to a single size and not integrate well with a bicycle (e.g., tie-in with brakes or gears). As training wheels are temporary, they have to be easily attachable/detachable. The same can be said for any traditional mechanism that a trainer may attach for speed control.

SUMMARY

Examples of the present disclosure relate to an adaptable bicycle that is configured to easily and efficiently adapt for riders of different sizes while providing both balance bike and pedal bike functionality. An exemplary bicycle is configured to enable utility adjustments to a front assembly, among other adjustable components, which creates a setup that comfortably accommodates either smaller riders or larger-sized riders. The bicycle of the present disclosure enables adjustment of exemplary components with minimal effort, which allows the bicycle to be re-configured anywhere and at any time with no tools needed. In one example, an exemplary bicycle is a children's bicycle that is designed and developed to grow with a child. An exemplary children's bicycle can be used for training younger children to ride a bicycle (with training wheels) and still be used as the child's primary bicycle as the child grows older and larger in size. For ease of understanding, the present disclosure references a children's bicycle or kids bike. However, it is to be understood that exemplary bicycle configurations and individual components described herein may be implemented individually as well as in bicycle designs of any size. Further disclosed is an exemplary training wheel device that may be attached to an exemplary bicycle to assist with training a young child to ride a bike.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 1B-1K illustrate magnified size views of components of an exemplary bicycle, with which aspects of the present disclosure may be practiced.

FIGS. 3-4 illustrate magnified size views of an exemplary bicycle to highlight exemplary components thereof with which aspects of the present disclosure may be practiced.

DETAILED DESCRIPTION

Figure 1A:
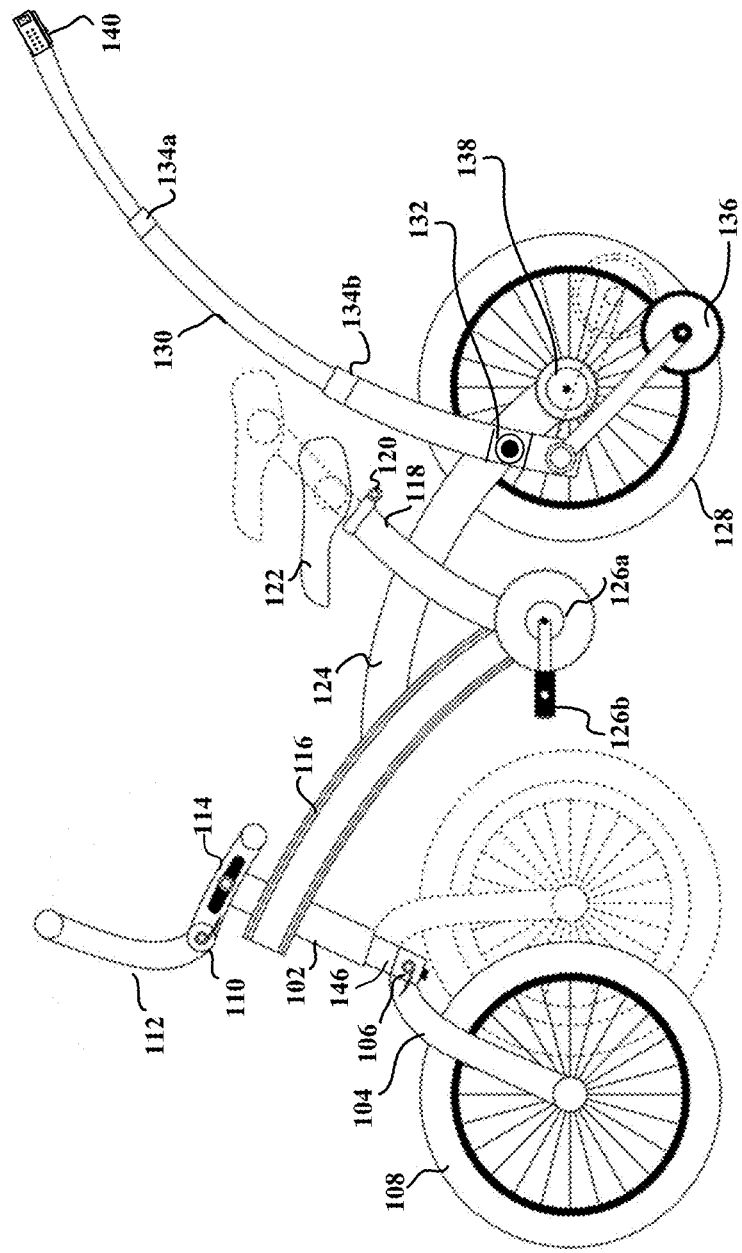
FIG. 1A illustrates a side view of an exemplary bicycle and attachable components, with which aspects of the present disclosure may be practiced.

Examples of the present disclosure relate to a bicycle that is configured to easily and efficiently convert to accommodate riders of different sizes while providing both balance bike and pedal bike functionality. The bicycle of the present disclosure enables adjustment of exemplary components with minimal effort, which allows the bicycle to be re-configured anywhere and at any time with no tools needed. Further disclosed is an exemplary training wheel device that may be attached to an exemplary bicycle to assist with training a young child to ride a bike. In further examples, the training wheel device is further adaptable to be configured to work with other types of wheeled transportation devices (e.g., a stroller or wheeled car seat), to enable geared and/or brake control for other types of wheeled transportation devices.

In one example, an exemplary bicycle is a children's bicycle that is designed and developed to grow with a child. An exemplary children's bicycle can be used for training younger children to ride a bicycle (with training wheels) and still be used as the child's primary bicycle as the child grows older and larger in size. For ease of understanding, the present disclosure references a children's bicycle or kids bike. However, it is to be understood that exemplary bicycle configurations and individual components described herein may be implemented individually as well as in bicycle designs of any size.

An exemplary children's bicycle is usable to train a small child (e.g., 2-3 years old) to ride a bicycle with training wheels and is further convertible to accommodate a growing size of a child. For instance, depending on the size of the child, an exemplary children's bicycle may grow to comfortably accommodate riders between 6 and 10 years old. In other instances, a larger version of an exemplary bicycle may be manufactured that is targeted for adolescents or adults. An exemplary bicycle is configured to enable utility adjustments to a front assembly, among other components, that comprises one or more components such as a modified front wheel fork, a modified head tube, a modified quick-release locking component and a modified bicycle stem. Such modified components are adaptable to enable a bicycle to change configuration through rotational and/or length adjustments, thereby enabling an exemplary bicycle to be easily adapted to riders of different sizes. As such, an adaptable bicycle of the present disclosure creates a setup that comfortably accommodates smaller riders or larger-sized riders. In examples herein, a front assembly of a bicycle may be rotatable and locked in 180-degree positions to maximize distal spacing and comfort for riders of different sizes without comprising stability and performance of the bicycle. For instance, a front assembly locking component (e.g., quick release bolt, switch, lever) may be engaged to lock the front assembly in a desired position, whether that position of the front assembly may be forward-facing (traditional) or backwards-facing (non-traditional). Other exemplary components are described herein to maximize comfort and ride-ability, where such components comprise but are not limited to: a unique v-shaped configuration of the down tube and the seat tube, an adjustable handlebar slot, handlebar locking component, an adjustable front wheel fork, an adjustable head tube, an adjustable seat post, a curved and elongated top tube and adjustable pedals (e.g., foldable pedals and/or lockable pedals), among other examples.

Among other components, an exemplary bicycle comprises: a front wheel, a rear wheel, handlebars, an adjustable handlebar slot, a locking mechanism to enable handlebar adjustment through the adjustable handlebar slot, a head tube, an adapted bicycle stem, a down tube, a front wheel fork (adjustable), a front assembly locking component configured to enable locking of a front assembly in 180-degree positioning, a down tube, a seat tube, a seat stem, a locking component configured to enable adjustment of a seat stem, a saddle, a pedal assembly (configured to provide a pair of foldable pedals and/or locking component to lock a pair of pedals in a fixed position), a front chain ring, a rear chain ring, a locking component configured for connection of attachments (e.g., an exemplary training wheel device), a bicycle chain, a brake assembly; and a gear assembly, among other examples. In alternative examples, an exemplary bicycle may comprise a one or more seat stays, gears or other traditional bicycle components as known to one skilled in the field of art. In addition to providing some new components and functionality, not seen with traditional bicycles, examples described herein provide a unique frame construction that supports stability and comfort for riders of different sizes.

An exemplary front assembly of the adapted bicycle is customized to enable the functionality described herein where riders of different sizes can easily adjust the size of the bicycle. In non-limiting examples, the front assembly comprises a front wheel fork and an adapted head tube that is attached to the front wheel fork. The head tube described herein in adapted to be reversed from a traditional head tube configuration, wherein the extendable portion of the head tube housing the bicycle stem, headset, etc., is at a bottom portion of the head tube (as opposed to a top portion of a head tube that is the case in traditional configurations). In some further examples, the front assembly may further comprise an adapted bicycle stem configuration, that is modified from a traditional bicycle stem configuration, where the front wheel fork may be connected to the reversed head tube via the modified bicycle stem that is connected with both components. This is enabled by an exemplary head tube being flipped or reversed, where the bicycle stem may be flipped or reversed as compared with traditional bicycle head tube/stem configurations. In such examples, the front wheel fork is connected to the bottom of the reversed head tube, which is traditionally a top portion of a traditionally-used head tube that normally has a bicycle stem connected with the handlebars. The modified configuration of the present disclosure enables the front wheel fork to be extendable, thereby providing distal variance so riders of different sizes can utilize the bicycle comfortably. An exemplary bicycle stem may be slidably adjusted to vary the size of the bicycle stem and/or front wheel fork when a quick-release locking component of the front assembly is disengaged.

An adapted head tube of the front assembly may be connected with a front wheel fork and/or modified bicycle stem in different versions the bicycle of the present disclosure. The head tube comprises a headset, housed within the head tube, enabling rotation of the front assembly and a quick-release locking component that is utilized to lock rotation of a front assembly of an exemplary bicycle. The headset, when in a freely-moving configuration, enables rotation of the front assembly in a first position, where the front wheel fork is forward-facing, and a second position, where the front wheel fork is backwards-facing. In some alternative configurations, the quick-release locking component may be modified to be attached to the front wheel fork and/or bicycle stem. This may require modified sizing, threading and interfacing of components such as the bicycle stem and/or head tube to enable varying positional placement of the quick-release locking component.

In any example, the quick-release locking component is engageable for locking rotation of the front assembly. The quick-release locking component when engaged, locks the front assembly in one of the first position and the second position thereby preventing rotation of the front assembly to return to the other of the first position and the second position. The quick-release locking component, when disengaged, is configured to enable rotation of the front assembly, via the headset, between the first position and the second position. It should be recognized that the front assembly of the bicycle, when the quick-release locking component is engaged, is configured to allow for some rotational movement and flexibility so that a user can comfortable steer and maneuver the front assembly of the bicycle for riding purposes. However, full 180-degree rotation (or greater) is restricted when the quick-release locking component is engaged. To enable such functionality, the quick-release locking component further comprises a locking engagement member that extends through a portion of an inside of the head tube and contacts a tension component affixed inside the head tube. When the quick-release locking component is engaged, the locking engagement member interfaces with the tension component to restrict motion of the headset preventing 180-degree rotation of the front assembly. For instance, the locking engagement member compresses the tension component to applying pressure on the headset so rotational motion is limited. When the quick-release locking component is disengaged, the tension component is decompressed within the head tube enabling full functionality of the headset to achieve 180-degree rotation of the front assembly. Use of a tension component (e.g., a spring configuration) enable some flex in the front assembly to provide enough rotational ability to steer an exemplary bicycle.

In combination with the adapted front assembly, the bicycle (or bicycle frame) of the present disclosure is further configured with an adapted handlebar configuration that accommodates riders of various sizes. For example, an adjustable handlebar slot is connected with the head tube and a pair of handlebars, wherein the adjustable handlebar slot provides a slot that enables the pair of handlebars to be slidably adjusted in a forward direction or a backward direction. This is different than traditional bicycle stem/handlebar configurations, where a bicycle stem is connected with a top portion of a head tube that enables handlebars to be adjusted vertically (e.g., up or down). An adapted bicycle frame further comprises a handlebar locking component (e.g., quick-release locking component) that is attached to the adjustable handlebar slot. The handlebar locking component that is engageable to lock the pair of handlebars in a position within the slot. The pair of handlebars are slidably adjustable in the forward direction or the backward directions when the handlebar locking component is disengaged. This is especially useful when the front assembly of the adapted bicycle is rotated to be locked in different positions.

Moreover, a pedal assembly may be tailored to accommodate riders of different sizes as well as enable the adaptable bicycle to be easily transformed between a balance bicycle and a pedal bicycle. For example, the pedal assembly may comprise a pair of pedals and a modified crank that comprises a locking component to lock the pair of pedals in a fixed position. This enables riders to utilize the pedals as footrests in a balance bike configuration. In one example, a modified crank may be configured to engage/disengage a locking component of the crank through a twisting action that enables locking pins (internally housed in the crank component) to engage/disengage with customized locking slots (also internally housed in the crank component). In another example, locking pins may be engaged/disengaged with locking slots through a pressable locking component or quick-release locking component attached the pedal assembly (e.g., on an exposed end of a crank).

In further examples, the pair of pedals of the pedal assembly are foldable (e.g., pair of foldable pedals), where the pair of pedals can be adjusted to accommodate for either a balance bike configuration or a pedal bike configuration. For instance, a pair of foldable pedals may be adjustable in either: a first pedal position having the pair of foldable pedals folded in an upright position for balance bike purposes or a second pedal position having the pair of foldable pedals engaged in a horizontal position to enable usage of the pair of foldable pedals for pedaling purposes. Such utility may be enabled through connected of one of more additional components to the pedal assembly such as hinge, push-pin folding mechanism or the like as known to one skilled in the field of art. In non-limiting examples, the pair of pedals may be made of a plastic, alloy or composite material that are sturdy, rigid and also lightweight to enable child riders to easily manipulate the pedal positions.

A bicycle frame of an exemplary bicycle further comprises an adapted base assembly that comprises a down tube that is attached to the head tube, and a seat tube that is attached to the down tube. In the adapted base assembly, the down tube and seat tube are engineered to align in a configuration where the down tube and the seat tube are each curved in opposition away from each other. This maximizes distal spacing for a rider when other components of the adapted bicycle are adjusted to help maximize comfort and stability of the bicycle. The base assembly further comprises a top tube attached to the down tube and seat tube, wherein the top tube is curved and extends outwardly from the down tube towards the rear of the bicycle frame. A portion of the top tube may extend outwardly, at an angle, from the seat tube. In some examples, the top tube may extend outwardly from a middle portion of the down tube through a middle portion of the seat tube. The portion of the top tube, extending outwardly from the seat tube, may comprise a bracket assembly for attachment of an accessory device to the bicycle frame. The accessory device may be an attachable/detachable training wheel device as described herein. This engineered configuration enables the attachable/detachable training wheel device to be comfortably connected with the bicycle frame without inhibiting a rider of the adapted bicycle.

For smaller versions of an exemplary children's bicycle, an attachable/detachable training wheel device (e.g., accessory device) may be attached to the rear of the bicycle, for example, on a portion of an exemplary top tube (or seat stay). The training wheel device is customized, as compared with traditional training wheel sets, where the training when device is configured to not only control deployment of a set of training wheels but also enable control over a brake assembly and/or a gear assembly that may be affixed to a bicycle. An exemplary children's bicycle is configured to enable a training wheel device to be quickly attached or detached from the bicycle frame. For instance, the training wheel device connects to a back portion of the exemplary top tube (or seat stay) via a bracket assembly and/or locking component (e.g., quick locking bolt). The back portion of the top tube may extend behind the seat tube and a saddle, where a bracket assembly may be mounted on the bicycle frame (and in some instances the training wheel device) above a portion of the top tube where the rear wheel, rear chain wheel, etc., may be attached. The training wheel device combines a set of deployable training wheels, a guide member and a control device (which may also be a handle mechanism). The training wheel device enables quick attachment/detachment of a set of training wheels to the bicycle without requiring tools. The exemplary training wheel device enables a trainer to control deployment training wheels as well as retraction of the training wheels in a fast and efficient manner. The guide member is usable for a trainer (e.g., parent) to control deployment of the training wheels as well as speed and/or braking control while a child is learning to ride a bicycle. The training wheel device may comprise a control portion that comprises a control device for deployment/retraction of the training wheels.

An exemplary control device (or multiple separate control components) may be configured to interface with other bicycle utilities to control functionality, for example, including but not limited to brake control and gear control. For instance, an exemplary bicycle may be configured to have a gear assembly comprising 2 or more gears. The training wheel device may be configured to connect with the gear assembly so that a control device, of the training wheel device, can be used to switch the gears on the bicycle. This is extremely useful in situations where an adult is guiding a child rider and teaching them how ride a pedal version of the bicycle. The person controlling the training wheel device can help keep the child-rider upright through the training wheel device and also control the speed the bicycle through switching of the gears. For instance, a first gear may be a normal pedaling gear, where if the child gains speed and is pulling the adult too fast, the adult, through the training wheel device, can switch the gears of the bicycle, which automatically slows the bicycle down. The adult, through the training wheel device, can quickly and easily switch back to another gear (e.g., back to the first gear), through the training wheel device, when the speed of the bicycle is comfortable for the adult. The training wheel device may be manually connected to the bicycle, as disclosed herein, where gear lines are configured to be adaptable so that a user can switch the gear lines between the training wheel device and the bicycle (e.g., when the training wheel device is not attached). In further examples, the training wheel device may be configured to connect with a brake line (e.g., a rear brake for the bicycle). A user, when the training wheel device is connected, is able to connect the brake line to some versions of the training wheel device to enable brake control of the bicycle through the training wheel device. An exemplary bicycle may further be configured with brake and/or gear line hardware guide components that guide a connection of a brake or gear line to the bicycle and/or training wheel device. Attachment and detachment of a gear assembly and/or brake assembly, as configured on bicycle, to enable attachment to another device (e.g., the training wheel attachment device) is known to one skilled in the field of art. An exemplary bicycle disclosed herein is configured with components to facilitate easier connection of such components.

As referenced above, an exemplary training wheel device quick is configured to enable adjustment of size and/or positioning of a guide member portion of the training wheel device. In one example, the guide member of the training wheel device is telescoping, where a trainer is configured to be able to quickly adjust a size of the guide member and lock the guide member (e.g., through locking joints/telescoping locking joints) in a comfortable position for training control of the bicycle. The training wheel device may further be comprised of a material that has some flex, where the guide member is rigid but still flexible enough that a user can apply pressure to assist with slowing down a rider of the bicycle. Such materials are known to one skilled in the field of art. In some instances, the training wheel device may comprise additional support components that help stabilize the structure of the guide member and prevent against bending or breaking. Such components include brackets, hinges or the like that may be affixed to the training wheel device at various positions. One skilled in the field of art should understand that positional placement of such support devices may vary to be placed anywhere on the training wheel device as determined through stress testing and product development.

FIG. 1A illustrates a side view of an exemplary bicycle 100 and attachable components, with which aspects of the present disclosure may be practiced. Bicycle 100 may be manufactured to comprise any of the components described herein. It is to be understood that not every component described is required for an exemplary model of bicycle 100. In alternative examples, different models of bicycle 100 can be manufactured, where various different models may vary the combination of components described herein. Additionally, it is to be understood that the size of described components of bicycle 100 may vary based on a model of the bicycle 100 that is being produced. For example, the size of component such as the wheels, the handlebars, the seat, the front wheel forks, tubes, etc., may be considerably smaller for a bicycle model that is designed to function for young children as compared to a bicycle model that is designed to function for adolescents or adults. Moreover, it is to be understood that the present disclosure builds upon what already known regarding bicycle components, where bicycle components as known to one skilled in the art may be included herewith to extend functionality of bicycle 100. Components of an exemplary bicycle frame, including tubular components, may be made from any strong and rigid material including but not limited to: steel, aluminum alloy, titanium carbon fiber and molded plastic, among other examples of materials used to build bicycle frames as known to one skilled in the field of art. FIGS. 1B-1K further illustrate utility of bicycle 100 through magnified size views that focus on specific portions of bicycle 100. FIGS. 1B-1K may further comprise additional components of bicycle 100 that are not initially visible in FIG. 1A. While FIGS. 1A-1K illustrate bicycle 100 in two dimensions, it is to be understood that components illustrated therein are mirrored (on both sides of the bicycle) creating a three-dimensional representation of bicycle 100 for actual use.

Bicycle 100 comprise a uniquely configured bicycle frame, which is designed to maximize utility of components of the bicycle 100 while maintaining stability and comfort for a rider in any adjustable configuration. Primarily, an exemplary bicycle 100 enables a rider or trainer to adjust the positioning of an exemplary front assembly to vary distal spacing between the rider and the front wheel/handlebars and pedal assembly, among other components. An exemplary bicycle frame comprises a front assembly. The front assembly may comprise but is not limited to: a head tube 102; a front wheel fork 104 (front fork); a front assembly locking component 106 configured to enable positional adjustment of an exemplary front wheel fork and/or head tube; a front wheel 108; an adapted bicycle stem 146, a handlebar locking component 110; a pair of handlebars 112; and an adjustable handlebar slot 114 that enables horizontal adjustment of the pair of handlebars. An exemplary front assembly provides a configuration that fosters unique interfacing between components to enable quick and efficient adjustment of a size of the bicycle 100. The front assembly may be locked in a forward position (traditional bicycle alignment) using an exemplary front assembly locking component, where the head tube, front fork and front wheel of bicycle 100 are forward-facing. In another example, the front assembly may be locked, using an exemplary front assembly locking component 106, in a reverse position, where the head tube, front wheel fork and front wheel are rear-facing. This enables the front wheel fork to be rotated and locked in 180-degree positions (e.g., forward or backwards), which creates different riding configurations for a rider of the bicycle.

An exemplary front assembly comprises a front assembly locking component 106 that enables the front assembly to be adjusted or toggled between a first position (forward-facing position reflecting a traditional bicycle riding experience) and a second position (a reverse position/backwards-facing riding experience; 180-degree rotation). In previously existing bicycle examples, if the handlebars were rotated leading the head tube, front fork and front wheel to be in a reversed position, operation of a traditional bicycle may be compromised where that bicycle operates in a wobbly and twitchy manner. This makes traditional bicycle configuration ill-equipped for sustained riding while the handlebars are rotated in a reversed position. Another major issue with attempting to ride a traditional bicycle with the handlebars rotated in a reversed position is that the rider is required to physically hold the handlebars in that position. If the rider lets the handlebars go, the handlebars will snap back to the original position, which means that a reversed position of the handlebars is not only temporary but also dangerous. This would be especially troublesome for young riders that are first learning to ride a bike. Through adjustment of the various components as well as the unique design of its machined components, the adaptable bicycle of the present disclosure resolves these issues and enables safe riding where the front assembly is locked in the first position or the second position.

The head tube 102 is a part of the bicycle frame that connects the front wheel fork 104, the pair of handlebars 112 and associated components (e.g., handlebar locking component 110 and adjustable handlebar slot 114). Size and dimensions of an exemplary head tube 102 may vary depending on size of the bicycle being manufacturer, for example, a children's bicycle or an adult bicycle. The head tube 102 may house a bicycle stem 146 as well as other components such as a front fork steerer tube and headset (e.g., collection of cups, spacers and bearings), as known to one skilled in the field of art. Such components are not illustrated in FIGS. 1A to 1K as they are known to one skilled in the field of art. A headset provides a rotatable interface between the head tube 102 and the front wheel fork 104. This allows the front assembly of bicycle 100 to rotate freely in at least 180-degree positions (forward-facing and rear-facing). Exemplary headsets may be threaded or unthreaded. A visual example of a headset 210 is shown in FIG. 2A, where the headset 210 is affixed to a bottom portion of the head tube 102 (and partially housed in the head tube 102) as well as proximate to the front assembly locking component 106.

As referenced above, an exemplary head tube 102 is reversed upside down, as compared with a traditional head tube mechanism. This may further allow adjustment of the front wheel fork 104, including extension of blades of the front wheel fork 104 that may be engineered to be extensible. In this reversed/upside down configuration, an exemplary bicycle stem 146 (also shown in FIGS. 1B and 1C) of the head tube 102 (or an extendible tube within the head tube) interfaces directly with the front wheel fork 104 to enable adjustment of the front wheel fork 104 for optimized spacing and stability. This reversed configuration enables height adjustment as well as rotary adjustment of the front wheel fork 104 by which the distance between a front wheel and a rear wheel may be increased. In one instance of the reversed (upside-down) configuration, a stem component 146 (e.g., bicycle stem, also shown in FIGS. 1B-1C) may be connected with the head tube 102 and the front wheel fork 104 to enable height, angle and/or and rotational adjustment of the head tube 102 and/or front wheel fork 104. For example, a bicycle stem 146 may interface with the front assembly locking component 106 (e.g., quick-release locking component), where when the front assembly locking component 106 is disengaged, any of the length, angle and/or rotational positioning of the front assembly may be manipulated. When the front assembly locking component 106 is engaged (e.g., locked), the front assembly may be restricted from adjusting in length (height), angle or rotational positioning.

An exemplary head tube 102 further comprises the front assembly locking component 106. As referenced above, the front locking component 106 is configured to engage/disengage a locking component to enable adjustment of one or more components of the front assembly of bicycle 100. Engaging the front assembly locking component 106 enables the front wheel fork 104 to be locked in a first position (forward-facing position) or a second position (rear-facing position/backwards-facing position), creating 180-degree positional variance. This configuration allows for greater distance between front and rear wheels of bicycle 100, thus becoming a bigger bike for a larger rider such as an older child. Furthermore, bicycle 100 enables adjustment of an exemplary front wheel fork 104 (and reversed bicycle stem) to maximize spacing for riders of different size as alternative to traditional bicycles where a rider may adjust the handlebars that are connected to a traditionally upward facing bicycle stem and still not comfortably operate a bicycle. In one non-limiting example, the front assembly locking component 106 may be affixed to a bottom portion of the head tube 102 (in the reversed configuration) closest to the front wheel fork 104 and/or bicycle stem 146. However, in other examples, positioning of the front assembly locking component 106 may vary along the head tube 102 or another component of the exemplary bicycle 100. For instance, the front assembly locking component 106 may be affixed to the front wheel fork 104, the bicycle stem 146 or a top portion of the head tube 102. This may require modified sizing, threading and interfacing of components such as the bicycle stem and/or head tube, where such engineering is known to one skilled in the field of art, thereby enabling varying positional placement of the front assembly locking component 106.

An exemplary front assembly locking component 106 may be a quick-release mechanism (e.g., quick-release locking component), which may be in any form including but not limited to: a bolt, a bracket, a skewer, a rod, a lever, a handle, a push button/spindle a pin and a switch, among other examples. Exemplary components of a quick-release mechanism and arrangement of such components are known to one skilled in the field of art. For instance, an exemplary quick-release mechanism may comprise a plurality of components including but not limited to any combination of: a lever/cam/skewer assembly, springs (e.g., conical springs), a hub axle, a retaining ring, ball bearings, locking pins, a bracket and an adjusting nut, as known to one skilled in the field of art. Inclusion of components such as springs and an axle may assure that a fair amount of direct pressure is applied to a quick-release lever/handle to enable engagement/disengagement, enabling most adjusts to be purposeful rather than involuntary. In some instances, a push button or lever of the quick-release mechanism may be housed by a protective cap or protective barrier (e.g., plastic cover or other similar material, nautical handle), which has to circumvented, removed, opened, etc., to actually make contact with the push button/lever of the quick-release mechanism. This may further prevent involuntary contact from being made with the quick-release mechanism.

A majority of the components of the quick-release locking mechanism are housed within the head tube 102 and/or bicycle stem 146 with the exception of a portion of an exemplary locking engagement member (e.g., lever, object connected with the quick-release component) that is used for engagement/disengagement of the quick-release mechanism of the front assembly locking component 106. An exemplary quick-release mechanism may work by clamping against components of an exemplary headset and/or bicycle stem to restrict movement of such components. In an example where the quick-release mechanism is engaged, a skewer or rod of a quick-release assembly may contact a component such as a bearing, a pin, tension component (e.g., spring) to restrict movement of the headset component and/or bicycle stem component, locking it in a set position. An order of contact may vary depending on whether models of bicycle 100 comprise an exemplary bicycle stem or not. As an example, when the quick-release locking mechanism is engaged, the rod or axle may slidably engage with one or more components of the headset (or an added tension component) to restrict rotational movement of the headset (e.g., prevent the front assembly from being rotated in 180-degrees, 360 degrees, etc.). In further examples, an exemplary headset or bicycle stem may be modified to connect with a rod or axle of the quick-release locking mechanism. In another example, the quick-release locking mechanism, when engaged, locks a bolt in place that restricts rotation of an exemplary headset. For instance, a locking of the quick-release locking mechanism pushes a bolt upwards to restrict movement of the headset and/or a tension component. When the quick-release locking mechanism is disengaged, position of the bolt may shift to enable rotation of the headset. For instance, the bolt is pulled downwards when the quick release locking mechanism is disengaged.

Above what is traditionally known about quick-release locking components, the locking component utilized herein is specifically configured to engage/disengage components of a front assembly to control rotation of the front assembly. The quick-release locking component when engaged, locks the front assembly in one of the first position and the second position thereby preventing rotation of the front assembly to return to the other of the first position and the second position. The quick-release locking component, when disengaged, is configured to enable rotation of the front assembly, via the headset, between the first position and the second position. It should be recognized that the front assembly of the bicycle, when the quick-release locking component is engaged, is configured to allow for some rotational movement and flexibility so that a user can comfortable steer and maneuver the front assembly of the bicycle for riding purposes. However, full 180-degree rotation (or greater) is restricted when the quick-release locking component is engaged. To enable such functionality, the quick-release locking component further comprises a locking engagement member that extends through a portion of an inside of the head tube and contacts a tension component affixed inside the head tube. When the quick-release locking component is engaged, the locking engagement member interfaces with the tension component to restrict motion of the headset preventing 180-degree rotation of the front assembly. For instance, the locking engagement member compresses the tension component to applying pressure on the headset so rotational motion is limited. When the quick-release locking component is disengaged, the tension component is decompressed within the head tube enabling full functionality of the headset to achieve 180-degree rotation of the front assembly. Use of a tension component (e.g., a spring configuration) enable some flex in the front assembly to provide enough rotational ability to steer an exemplary bicycle.

Continuing description of the front assembly, an exemplary front wheel fork 104 is attached to the head tube 102. In one example, the front wheel fork 104 may be welded to the bottom portion of the head tube 102. An exemplary front wheel fork 104 may comprise one or more fork tubes, as known to one skilled in the field of art. Exemplary fork tubes may further connect with the head tube 102 through the front fork steerer tube as known to one skilled in the field of art. In examples, fork tubes may be configured to enable adjustment of the front wheel fork 104 including but not limited to: vertical adjustment, horizontal adjustment and angle. For instance, exemplary fork tubes may be connected with bicycle stem 146, where when the front assembly locking component 106 is disengaged, components of the front wheel fork 104 may be adjusted in any of the above identified manners, for example, to account for a size of a rider. In one instance, a headset like design is implemented in tubing of the front wheel fork 104 (e.g., front fork tube) or the front fork tube is connected with the headset in the head tube 102, which may enable vertical and/or horizontal adjustment of blades of the front fork. In alternative examples, the front wheel fork 104 may comprise one or more individual components (e.g., quick-lock/release components) enabling adjustment of the front wheel fork 104 or specific portions of the front wheel fork 104 such as the fork blades.

In any example, the front wheel fork 104 is constructed out of a material that enables the fork to be stiff and rigid. Exemplary materials for fork construction that can produce a stiff front fork have been referenced in the foregoing description and are known to one skilled in the field of art. A thickness and weight of frame components including the front wheel fork 104 may vary depending on the size of the bicycle being manufactured without departing from the spirit of the present disclosure. Bicycle 100 is configured to enable stable and comfortable riding with the front wheel fork 104 forward-facing as well as backwards-facing. In this way, a configuration of the front fork 104 is optimized, from that of traditional bicycle, thereby enhancing stability for the rider (in any position) as well as maximize distal spacing for the rider thus increasing comfort and ride-ability of the bicycle. In examples where the front wheel fork 104 is in a reversed position and a rider is trying to ride, traditional bicycles may be twitchy and wobbly, which makes the rider feel unstable and unsafe. As compared with traditional forks, an exemplary front wheel fork 104 described herein may manufactured to be thicker (or wider) and heavier, where a traditional fork may be smaller and thinner/skinnier, for example, on a children's bicycle. This utility design may provide comfort and stability for the rider, making the bicycle feel more stable and less twitchy.

In at least one example, an exemplary front wheel fork 104 is curved, extending outwardly at an angle from the head tube 102. For instance, blades of the front wheel fork 104 may be curved at the top (e.g., at approximately 90 degrees) and attached to the head tube 102 or reversed bicycle stem 146 extending from a bottom portion of the head tube 102. Moreover, an exemplary curved front fork may also be elongated, as compared with traditional forks on children's bicycles. Elongation of the front wheel fork 104 is aimed at increasing the rake and reducing trail of the bicycle, thereby providing greater stability in instances when the front fork is reversed.

A front wheel 108 may be connected with the front wheel fork 104. For example, front wheel fork 104 may comprise a fork-end or set of dropouts that enable connection of the front wheel 104 to the front wheel fork 104. Exemplary components of a wheel of a bicycle are known to one skilled in the field of art as well as mechanisms for connection the front wheel 108 to the front wheel fork 104 are known to one skilled in the field of art and may comprise but are not limited to bolt(s), quick-release mechanisms or the like. Size of the front wheel 108 may vary depending on a model of bicycle 100 that is being manufactured. For example, tire sizes may range from 12 inches to 26 inches for children's bicycles. However, bicycle 100 may be configured to work with tires of any size. In at least one example, bicycle 100 may be manufactured and sold with multiple sets of tires of different sizes, for example, 12-inch tires (front wheel 108 and rear wheel 128) and 16-inch tires to enable the tires to be swapped out so that a child may more comfortably ride bicycle 100 as the child grows. Additionally, placing the front assembly in the different positions (e.g., first position and second position) may allow for different size wheels to be attached to the bicycle (e.g., as kids grow bigger or larger riders utilize the bicycle).

The front assembly of bicycle 100 may further comprise handlebar components including a handlebar locking component 110, a pair of handlebars 112 and an adjustable handlebar slot 114. As the front assembly may be rotated and locked in 180-degree positions, adjustment of the pair of handlebars 112 is necessary to optimize rider comfort for riders of different sizes. Handlebars provide steering control for a bicycle. Typically, handlebars are adjustable vertically, via raising/lowering a bicycle stem. Exemplary bicycle 100 differentiates from such configurations by enabling horizontal adjustment of the pair of handlebars 112 (e.g., forwards and backwards) via a combination of the handlebar locking component 110 and the adjustable handlebar slot 114. This type of adjustment optimizes handlebar positioning, for example, when the front assembly is rotated in 180-degree positions. The pair of handlebars 112 may any type of handlebar including but not limited to: flat bars, curved bars, riser bars, drop bars, bullhorns, aero bars, cruiser bars, H bars and butterfly bars, among other examples. An exemplary pair of handlebars 112 may be sized for a model (e.g., for children or adults) of bicycle 100 that is being manufactured. In examples where an exemplary bicycle 100 is a children's bicycle that is used for training young children to ride a bike, an exemplary pair of handlebars 112 may be mid-rise handlebars, which may present handlebar positioning that may provide increase control of bicycle 100 as well as minimize the strain on the neck of the rider. Other examples of handlebars that may be used include low-rise handlebars (e.g., flat bars), which may be best for aggressive or all-terrain riding. Alternatively, high-rise handlebars (e.g., cruiser bars) may be used as well, though this may limit overall control and maneuverability for an in-experienced rider.

Hand brakes (not shown) may also be connected to the bicycle frame of bicycle 100 as known to one skilled in the field of art. For example, the hand brakes (e.g., brake levers or pedals) are attached to the pair of handlebars 112 of the front assembly and one or more brake lines may run across components of the bicycle frame including the front assembly and a base assembly connecting with a brake mechanism on the rear of bicycle 100. Exemplary hand brakes may be of any kind as known to one skilled in the field of art including but not limited to rim brakes, disc brakes and drum brakes, among other examples. In alternative examples, bicycle 100 may be configured to work with coaster brakes as an alternative to handbrakes. Coaster brakes and implementation are known to one skilled in the field of art. In some alternative examples, bicycle 100 may comprise a hybrid braking system that may combine handbrakes and coaster brakes to further train children how to use both types of brakes. As previously referenced, brake lines may be connected to an attachable/detachable training wheel device that allows a user of the attachable/detachable training wheel device to control brake functionality on behalf of a rider. This is useful in situations such as when a parent is teaching a child to ride a bicycle.

An exemplary handlebar locking component 110 is used to enable adjustment of the pair of handlebars 112. As referenced above, handlebar height is typically adjusted through manipulation of a bicycle stem. The handlebar locking component 110 (e.g., handlebar locking mechanism) of the present disclosure is a quick release/lock that enables (horizontal) sliding of the handlebars forward or backwards through the adjustable handlebar slot 114. Examples of quick-release locking mechanisms have been previously described. When the handlebar locking component 110 is unlocked, the pair of handlebars 112 are configured to slide freely through any portion of the adjustable handlebar slot 114. In one example, the adjustable handlebar slot 114 is a single unitary slot, where the pair of handlebars 112 can be moved into any position within the single unitary slot while the handlebar locking component 110 is unlocked. A user may unlock the handlebar locking component 110, move the pair handlebars 112 to a desired position within the adjustable handlebar slot 114 and re-engage the handlebar locking component 110 to lock the pair of handlebars 112 in place. That is, the handlebars may be slidably (e.g., forwards and backwards) adjusted through the entirety of the adjustable handlebar slot 114. In an alternative example, the adjustable handlebar slot 114 may comprise a plurality of positional slots, where a user may unlock the handlebar locking component 110 and horizontally slide the handlebars to a desired positional slot and lock the handlebars in place through re-engagement of the handlebar locking component 110.

Bicycle 100 further comprises a base assembly that is affixed to the front assembly. The base assembly may comprise: a down tube 116; a seat tube 118; an adjustable seat post 162 (shown in FIGS. 1E and 1F); a saddle 122; and a top tube 124. Further connected to the base assembly is a rear wheel 128; an attachment locking mechanism 132 that is connected with the top tube 124; and a rear chain assembly 138. In some examples, an exemplary training wheel device 130 may be attached to the rear of the top tube 124 via the attachment locking mechanism 132, for example, to enable assistance for training young children to ride bicycle 100. However, the training wheel device 130 is attachable and detachable from bicycle 100, where some models of bicycle 100 may not require the training wheel device 130 to be a necessary component. The base assembly may further comprise other known bicycle components, as known to one skilled in the art, comprising but not limited to: a bicycle chain; chain wheels; chain guards; brakes; and bicycle gears, among other bicycle components. For instance, bicycle pedals 126b may be configured to operate with a coaster brake assembly, as known to one skilled in the field of art, which may provide an alternative to requiring hand brakes.

Exemplary tubular components such as the down tube 116, seat tube 118 and top tube 124 may be constructed out a similar material as described in the foregoing description. An exemplary down tube 116 connects components of the front assembly of the bicycle frame with other components of the base assembly. The down tube 116 may be welded to the head tube 102 of the front assembly. In some examples, the down tube 112 and the head tube 102 may be welded as single unit. In one instance, the down tube 112 and the head tube 102 are constructed in a manner with each is flush with the other. In alternative instances, the down tube 112 may protrude forward from the head tube 102, for example, holding accessories (e.g., light fixture, small basket).

The down tube 116 may be welded with other tubular components such as the seat tube 118 and the top tube 124. The down tube 116 is also directly connected with the seat tube 118 and the top tube 124. The shaping of the down tube 116 and the seat tube 118 of the exemplary bicycle 100 is engineered to maximize spacing and comfort for riders of different sizes through a unique V-shape configuration. To create the V-shape configuration, the down tube 116 and the seat tube 118 are curved in opposition of each other, where the down tube 118 arches/curves away from the seat tube 116 and the seat tube 118 arches/curves away from the down tube 116. In essence, down tube 116 and the seat tube 118 create an arching V-shape for the bicycle frame that is projects upwardly (vertically) from the ground and provides a larger and more stable base for bicycle 100 as compared with traditional children's bicycles.

The seat tube 118 is connected to a saddle 122 (i.e. bicycle seat). The saddle 122 may be in any shape and any material as known to one skilled in the field of art. As the V-shape configuration comprises an arching seat tube 118, a seat stem 162 (as shown in FIGS. 1E and 1F) for the bicycle saddle 122 extends at an angle that follows the trajectory of the arched seat tube 118. This configuration creates more space for a larger rider (e.g., larger child) to ride more comfortably upon adjustment of the saddle 122. The same can be said for a smaller rider, where adjustment of the saddle 122 may be made to enable more comfortable riding. The seat tube 118 may further comprise a locking component 120 that enables locking/unlocking of the seat stem/post for adjustment of positioning of the saddle 122. Exemplary locking component 120 may be a quick-release locking mechanism as described in the foregoing description. The locking component 120 for the seat stem 162 may be affixed to the seat tube 118 or the seat stem 162.

Additionally, a front chain wheel/ring 126a and a bicycle pedal assembly 126b are attached to base assembly, for example, at the bottom of the intersection between the down tube 116 and seat tube 118. Configuration and implementation of an exemplary front chain wheel/ring 126a with an exemplary bicycle pedal assembly 126b are known to one skilled in the field of art. For example, the front chain wheel/ring 126a may comprise but is not limited to: a hub, a crank, and a front derailleur, among other exemplary components. The front chain wheel/ring 126a is connected with the bicycle pedal assembly 126b, which comprises a set of pedals connected to the crank of the front chain wheel/ring 126a. In one example, a limited but sufficient chain cover (not shown) may be attached to the front chain wheel/ring 126a to protect the chain ring. In a non-limiting example, a circular chain cover (e.g., plastic or metal) may be attached over the front chain wheel/ring 126a, where the chain cover does not extend to the rear dropout of bicycle 100 as is the case with some other children's bicycles. This is because bicycle 100 may also be configured for attachment of accessory devices such as the training wheel device 130 on the rear of the bicycle frame of bicycle 100.

Moreover, a pedal assembly 126b may be tailored to accommodate riders of different sizes as well as enable the adaptable bicycle to be easily transformed between a balance bicycle and a pedal bicycle. For example, the pedal assembly 126b may comprise a pair of pedals and a modified crank that comprises a locking component to lock the pair of pedals in a fixed position. This may enable riders to utilize the pedals as footrests in a balance bike configuration. In one example, a modified crank may be configured to engage/disengage a locking component of the crank through a twisting action that enables locking pins (internally housed in the crank component) to engage/disengage with customized locking slots (also internally housed in the crank component). In another example, locking pins may be engaged/disengaged with locking slots through a pressable locking component or quick-release locking component attached the pedal assembly 126b (e.g., on an exposed end of a crank).

In further examples, the pair of pedals of the pedal assembly 126b are foldable (e.g., pair of foldable pedals), where the pair of pedals can be adjusted to accommodate for either a balance bike configuration or a pedal bike configuration. For instance, a pair of foldable pedals may be adjustable in either: a first pedal position having the pair of foldable pedals folded in an upright position for balance bike purposes or a second pedal position having the pair of folded pedals engaged in a horizontal position to enable usage of the pair of foldable pedals for pedaling purposes. Such utility may be enabled through connected of one of more additional components to the pedal assembly 126b such as hinge, push-pin folding mechanism or the like as known to one skilled in the field of art. In non-limiting examples, the pair of pedals may be made of a plastic, alloy or composite material that are sturdy, rigid and also lightweight to enable child riders to easily manipulate the pedal positions.

The base assembly further comprises a top tube 124 that is welded to the down tube 116 and the seat tube 118. An exemplary top tube 124 may be engineered to curve away from the down tube extending towards the rear of the bicycle. In one example, the top tube 124 may extend from the middle of down tube 116 to the center of the rear wheel 128 of the bicycle 100, for example, where dropouts may be mounted. For instance, the top tube 124 may have a front portion that is between the down tube 116 and the seat tube 118 and a back portion that extends behind/past the seat tube 118 towards the rear of the bicycle. In such a configuration, seat stays of a traditional bicycle are eliminated and no longer needed for support. One benefit to this configuration is that the tensile strength of the top tube 124 may carry through to the rear portion of the bicycle where accessory devices, such as training wheel device 130, may be attached. In alternative instances, a separate seat stay may be attached to the seat tube 118 extending outwardly towards the rear of the bicycle.

The back portion of the top tube 124 (or a seat stay) may be engineered to be wider for strength and stability purposes. In some examples, a parent or trainer may be pulling on the back portion of the top tube 124 where an exemplary training wheel device 130 may be attached. Engineering and stress testing may determine an appropriate size and tensile strength for the top tube 124 (or seat stay) and any other components of an exemplary bicycle frame. In one instance, the entirety of the top tube 124 may comprise a uniform size and thickness. In another instance, the back portion of the top tube 124, replacing a traditional seat stay, may be engineered to be wider than the other portion of the top tube 124 that is connected between the down tube 116 and the seat tube 118. In any case, the back portion of the top tube 124 (or a seat stay) may be curved to follow the angle and trajectory of a front portion of the top tube 124 that is between the down tube 116 and the seat tube 118. A shape of the top tube 124 may vary without departing from the spirit of the present disclosure. In one instance, the back portion of the top tube 124 (or a seat stay) is oval-shaped and engineered to be thin enough to enable brackets and/or bolt connections to be mounted therethrough.

In other examples, a configuration of a top tube 124 may vary to enhance stability of the bicycle 100. An exemplary seat stay may mimic a back portion of the top tube 124, where the seat stay may follow the curved trajectory of the top tube 124. In one alternative instance, the top tube 124 may be welded between the down tube 116 and the seat tube 118 in a straight configuration (e.g., perpendicular between the down tube and seat tube). In such an alternative example, a seat stay (not shown) may be welded to the seat tube and extend outwardly from the seat tube towards the rear of the bicycle. In that case, the seat stay may curve away from the seat tube 118 in a manner that extends towards the rear of the bicycle 100 (where a rear wheel may be mounted).

The back portion of the top tube 124 (or the seat stay) may further comprise a bracket assembly 132 for attachment of an accessory device to the bicycle frame of bicycle 100. As referenced in the foregoing, an example of an accessory device is a training wheel device 130 that is attachable to and detachable from the bicycle frame. The bracket assembly 132 is used to connect the training wheel device 130 to the bicycle frame, for example, to the back portion of the top tube 124 (or the seat stay). Components of an exemplary bracket are known to one skilled in the field of art. An assembly bracket assembly 132 may comprise but is not limited to: a bracket, a bracket connector (attached to an accessory device) and one or more bolts, clamps, etc., to secure an accessory device to the back portion of the top tube 124 (or seat stay). An exemplary bracket assembly 132 is manufactured out of material that has a high tensile strength and is able to withstand a large amount of force being applied to the bracket. Examples of such materials are known to one skilled in the field of art. In operation, a trainer may be controlling operation of bicycle 100, to assist a young rider, via the training wheel device 130. In one example, the bracket assembly 132 overlaps a top side of the top tube 124 (or seat stay) for stability and strength. For instance, the bracket assembly 132 may overlap 90 percent or more of the top portion of the top tube 124 (or seat stay). However, an amount of overlap may vary depending on engineering testing without departing from the spirit of the present disclosure.

The bracket assembly 132 may further comprise one or more mounting slots to enable engagement of the one or more bolts (or other locking mechanisms), which are used to secure an accessory device to the bicycle frame. For example, two mounting bolt slots, one on each end the bracket assembly 132, may be included therein. A bracket component, on an accessory device, may interface with a bracket component, on the bicycle frame, enabling a user to secure the accessory device to the bicycle frame using the bolt(s). In an alternative example, one or more apertures may be drilled into the bicycle frame to enable securing of an accessory device to the bicycle frame via the bracket assembly 132. In that example, exemplary bolts may pass through the one or more apertures to lock into an opposing side of a bracket of the bracket assembly 132. This may assist with transferring some of the stress of a joint between the bicycle frame and the bracket assembly 132 through the top tube 124 (or seat stay) which may have greater tensile strength.

Additionally, bicycle 100 may comprise a rear wheel 128 that is connected to the back portion of the top tube 124 (or seat stay). The rear wheel 128 may be the same wheel size, shape, type, etc. as the front wheel 108 previously described. For example, tire sizes may range from 12 inches to 26 inches for children's bicycles. Attachment and components used for attaching a wheel to a bicycle, including the front wheel 108 and the rear wheel 128, are known to one skilled in the field of art. As an example, the bicycle frame may be equipped with a quick-release mechanism enabling attachment/detachment of the rear wheel 128 to a rear chain assembly 138. Components of an exemplary rear chain assembly 138 are known to one skilled in the field of art. For example, the rear chain assembly 138 may comprise but is not limited to: a hub, a freewheel (cassette), a rear derailleur, among other exemplary components. Bicycle 100 may further comprise dropouts, affixed to the bicycle frame, to enable connection of the rear wheel 128 to the bicycle frame. Additionally, bicycle 100 further comprises a bicycle chain (not shown) that may be attached to the rear chain assembly 138 and the front chain wheel/ring 126*a*, as known to one skilled in the field of art.

An exemplary bicycle 100 may further comprise a gear assembly (not shown). A gear assembly and incorporation of a gear assembly into a working bicycle is known to one skilled in the field of art. Above what is known in the field of art, the present disclosure discloses the ability to manipulate the gear assembly so that the gear assembly is connectable with an attachable/detachable training wheel device 130.

As referenced in the foregoing description, an exemplary training wheel device 130 connects to portion of the top tube via the bracket assembly 132. The training wheel device 130 combines a set of deployable training wheels 136, a guide member (portions of which are illustrated in FIGS. 1I-1K) and a control device 140 (or handle mechanism) that is affixed to the guide member. The training wheel device 130 enables quick attachment/detachment of the set of training wheels 136 to the bicycle without requiring tools. For instance, the configuration of bicycle 100 enables a user to attach the training wheel device 130 to the back portion of top tube 124 (or seat stay) and just as easily remove it when not in use. Attachment/detachment of the training wheel device 130 is configured to be easier than requiring a user to attach/remove a set of training wheels to a bicycle. In further examples, the training wheel device 130 may be attached to other types of transportation devices such as strollers, or wheeled car seat, wagons, etc., to enable similar control to that described with respect to bicycle 100.

The guide member is usable for a trainer (e.g., parent) to exert force and/or use features of control device 140 to control bicycle 100 while a young child is learning to ride. The exemplary training wheel device 130 enables a trainer to control deployment of the set of training wheels 136 as well as retraction of the training wheels 136 in a fast and efficient manner, through the control device 140. The guide member may be an elongated oval shaped tubing (or multiple tubular components) that enables mechanical components to be housed within or attached to the tubular portion(s). In one example, the guide member of the training wheel device 130 is telescoping, where a trainer is able to quickly adjust a size of the guide member and lock the guide member (e.g., through locking joints/telescoping locking joints) in a comfortable position for training control of the bicycle 100. Examples of telescoping functionality of the guide member is illustrated in FIGS. 1I to 1K and subsequently described in further detail. Moreover, a shape of the training wheel device 130 curves outward away from the bicycle so that a trainer can comfortable stand behind the bicycle frame and still control bicycle 100.

The guide member may comprise a plurality of portions comprising but not limited to: a top portion, a bottom portion and a middle portion (refer to at least FIG. 1I and the accompanying description). Tubular components of the guide member may be made out of a sturdy but flexible material, for example various types of metals (e.g., spring steel), composite fiber or plastics as known to one skilled in the field of art. Sizing of the individual portions of the guide member may vary in different models. In one example, the guide member may be manufactured where portions of the guide member, that are further from the distal end (of the top portion), become thinner as guide member reaches a portion (bottom portion) that attaches to the bicycle frame. In another example, the bottom portion of the guide member may be thicker than the top and middle portions of the guide member, for example, to provide a more solid base for attachment of the training wheel device to the bicycle frame. The guide member may further comprise one or more telescoping joints 134*a* and 134*b*, respectively, that enable a trainer to quickly adjust the size of the training wheel device 130. As an example, telescoping joints 134*a* and 134*b* may comprise a locking mechanism that is enable through locking pins, spring clicks or the like in combination with actions such as twisting and locking and pressing of button(s)/lever(s), among other examples.

An exemplary control device 140 is configured to interface with other bicycle utilities to control functionality including but not limited to: deployment of the set of training wheels 136; braking control; and gear control. In non-limiting examples, the control device 140 may be a depressible control pad (e.g., comprising buttons to control various functionality) or a handle-like mechanical mechanism that enables a user to exert force to raise/lower the set of training wheels 136. Control device 140 may comprise a plurality of control elements (buttons, levers, spring clips) that enables a trainer to control various aspects of the bicycle 100. In one instance, control device 140 may comprise a button-like control for deployment of the set of training wheels 136 and another button for application of one or more bicycle brakes (e.g., front brake and/or rear brake) where the training wheel device 130 interfaces with an exemplary brake assembly. A brake assembly is a collection of components configured to for the application of braking as known to one skilled in the field of art. In a further example, an exemplary bicycle may be configured to interface with a gear assembly (e.g., multi-gear stack exchange) to enable control for switching gears of the gear assembly. Components of a gear assembly are known to one skilled in the field of art. Interfacing between the training wheel device 130 and the gear assembly enables a trainer to control the speed of bicycle 100 to maintain safety for a child as well as comfort for a parent training the child to ride bicycle 100. In one instance, a third control button may be configured to control the gear assembly.

Housed within the guide member portions is spring-enabled assembly that provides control over deployment of the set of training wheels 136. A visual example of the spring-enabled assembly is illustrated in FIG. 1J, among other portions of the present disclosure. The spring assembly may comprise one or more springs, that, when engaged, are configured to exert force and deploy the training wheels in a usable position (touching the ground). The spring assembly further comprises an attachment mechanism that connects the spring with a handle/control device 140 of the guide member. Examples of an attachment mechanism comprise but are not limited to: one or more springs, wires (e.g., metal), spring clips, cable(s), a cable reel and a spring motor assembly, among other examples.

Furthermore, as referenced above, training wheel device 130 may be connected with a brake assembly or gear assembly of bicycle 100. A brake line (or lines) of the brake assembly may be connected with the training wheel device 130, for example, with a control component (e.g., button, lever) that enables a trainer to apply the brakes to the bicycle via the control device 140. In another instance, a gear line (e.g., to a gear shifting mechanism) may be routed to the training wheel device 130, for example, with a control component (e.g., button, lever) that enables a trainer to adjust the gears of the bicycle via the control device 140. Once the training device 130 is removed permanently, brake lines and/or gear lines may be manually re-routed to the front assembly of the bicycle, which may comprise a brake component and/or a gear shifting component attached to the pair of handlebars 112. This enables the child to control the brakes and/or gears of the bicycle themselves. Exemplary brake components and gear shifting components are not illustrated in FIGS. 1A-1K because such components, including brake lines and gear lines, are known to one skilled in the field of art. In some examples (not shown), a bicycle frame may be fashioned with defined slots, in the bicycle frame, to guide a user with switching control of a brake assembly and/or a gear assembly between the front of the bicycle 100 and the training wheel device 130.

FIGS. 1B-1K illustrate magnified size views of components of an exemplary bicycle, with which aspects of the present disclosure may be practiced. FIGS. 1B-1K further exemplify components of bicycle 100 (FIG. 1A) as well as provide views of additional components of exemplary bicycle 100.

Figure 1B:
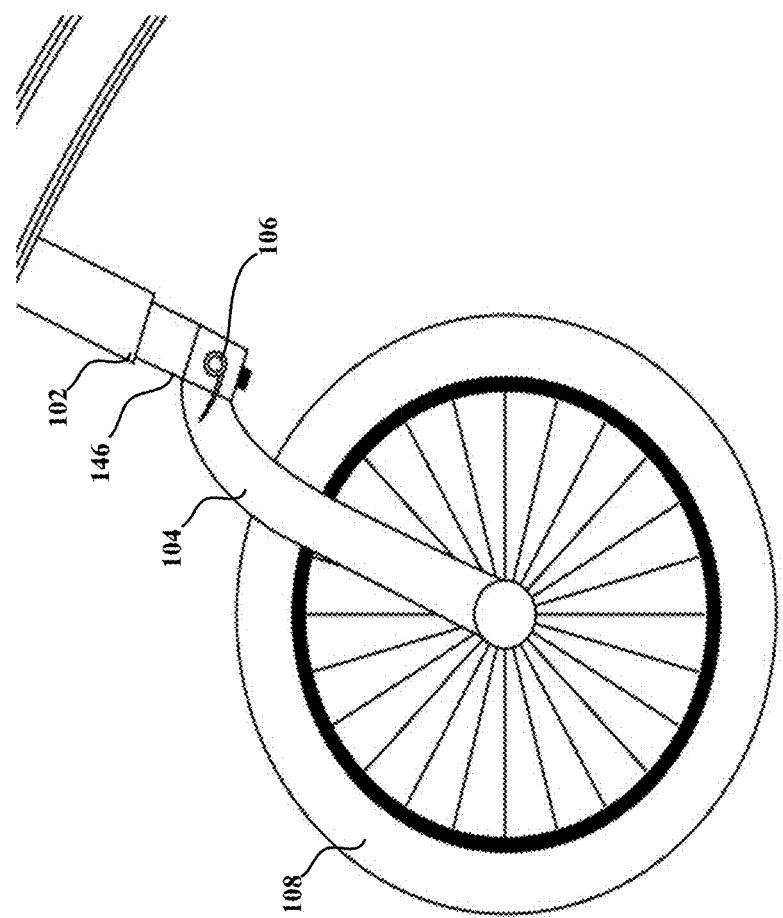
Figure 2A:
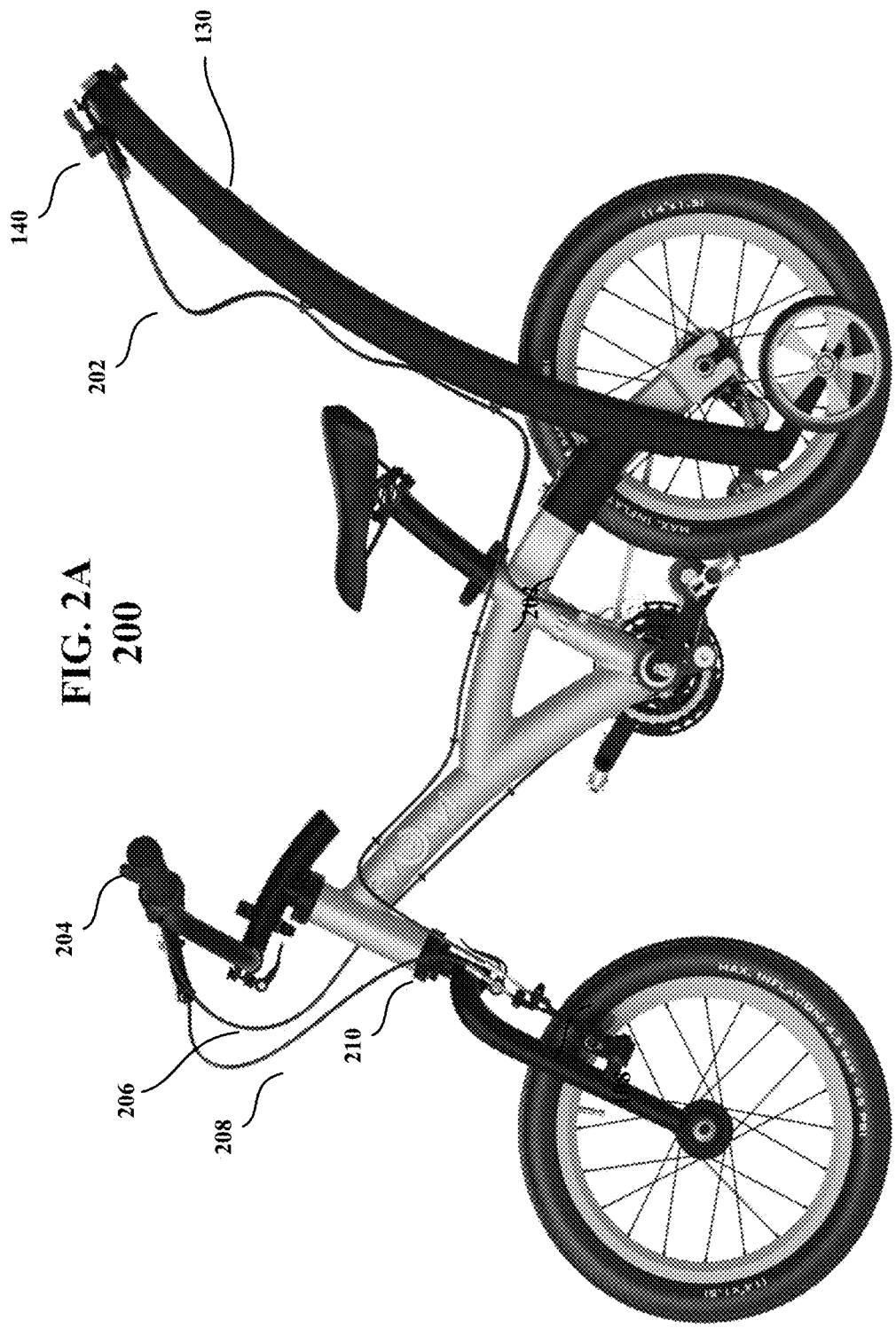
FIGS. 2A-2B illustrate side views of an exemplary bicycle with which aspects of the present disclosure may be practiced.

FIG. 1B provides side view 145, illustrating a forward-facing position (traditional) of an exemplary front assembly of bicycle 100 (FIG. 1A). The front assembly locking component 106 is engageable to lock the front assembly in the forward-facing position shown in side view 145.

FIG. 1C provides side view 150, illustrating a backwards-facing position (reversed; non-traditional) of an exemplary front assembly of bicycle 100 (FIG. 1A). The front assembly locking component 106 is engageable to lock the front assembly in the backwards-facing position shown in side view 150.

Figure 1D:
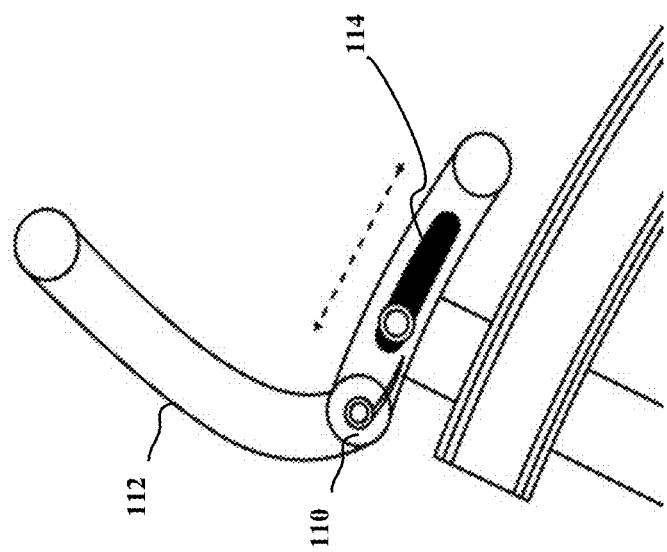
Figure 1E:
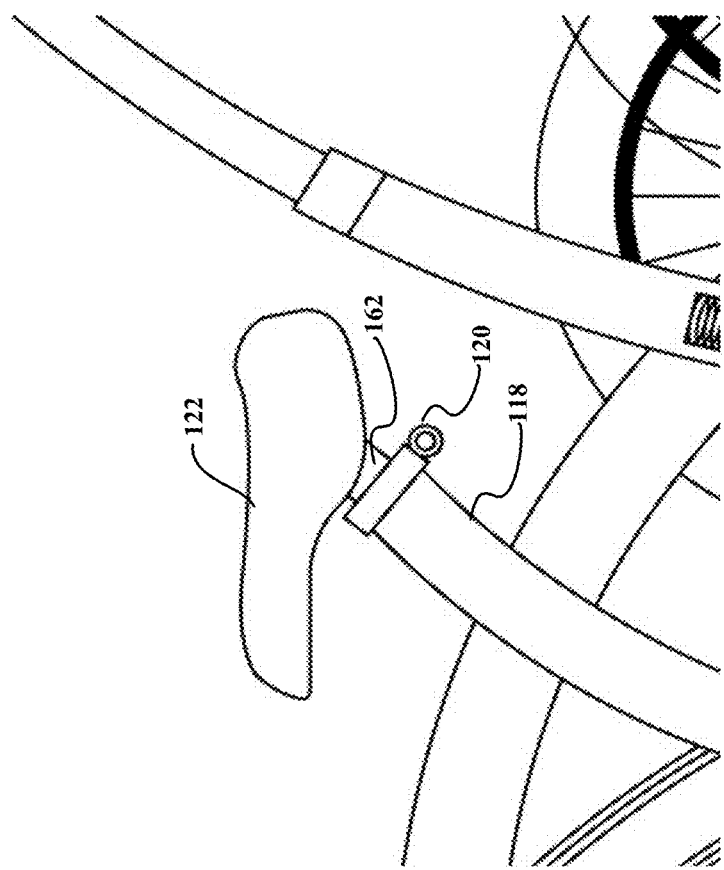
Figure 1F:
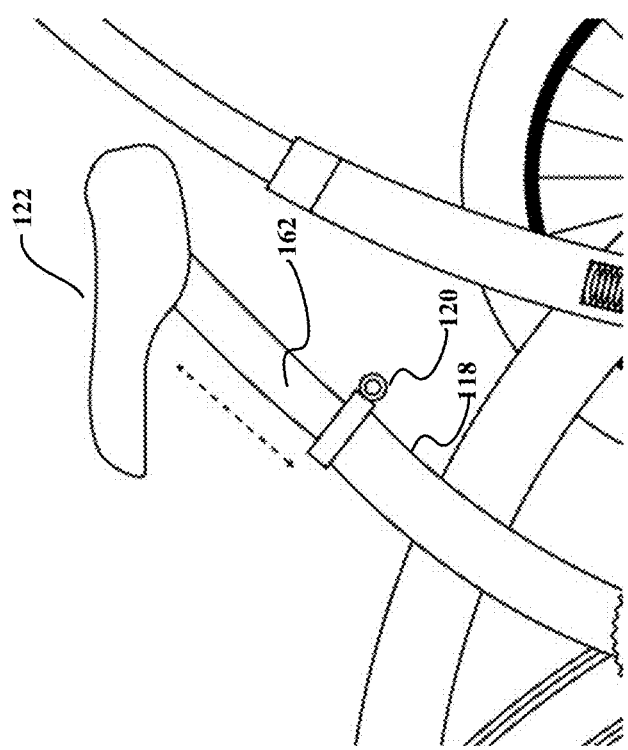

FIG. 1D provides side view 155, illustrating exemplary handlebar components of bicycle 100 (FIG. 1A). As referenced in the foregoing description, handlebar components of bicycle 100 comprise: a handlebar locking component 110, a pair of handlebars 112 and an adjustable handlebar slot 114. Side view 155 illustrates adjustment of the pair of handlebars 112. For example, a user may disengage the handlebar locking component 110 and slide the pair of handlebars (horizontally) through the adjustable handlebar slot 114. While the handlebar locking component 110 is disengaged, a user may slide and position the pair of handlebars 112 at any point within the adjustable handlebar slot 114. For example, a user may lock the front assembly of bicycle 100 in a backwards-facing position (reversed; non-traditional) and adjust the pair of handlebars 112 through the adjustable handlebar slot 114 for improved comfort and stability of the rider. As described in the foregoing description, the adjustable handlebar slot 114 may be fashioned with slots (pre-fabricated slots) that enable a user to lock the pair of handlebars 112 in specific set positions within the adjustable handlebar slot 114. In additional examples, bicycle 100 may further comprise components that enable the handlebars to be adjusted in other orientations such as the angle of the handlebars.

FIG. 1E provides side view 160, illustrating seat stem 162, which enables adjustment of a height of the saddle 122 (bicycle seat). A user may disengage/unlock the locking component 120 for the seat stem 162, where the user can raise or lower the seat stem 162 when the locking component 120 is disengaged. The locking component 120 may be engaged/locked to lock seat stem 162 into a desired position. The seat stem is affixed to and extends out from the seat tube 118.

FIG. 1F provides side view 165, illustrating a continued example of utility of seat stem 162. As seen in side view 165, the seat stem 162 may be raised or lowered in a vertical manner, for example, when the locking component 120 is disengaged. As referenced in the foregoing description, the trajectory of the seat stem 162 follows the curve of the seat tube 118. This may further extend the distal spacing from the saddle 122 to the front assembly of bicycle 100, which may provide added comfort for larger-sized riders including instances when the front assembly is locked in a backwards-facing position.

Figure 1G:
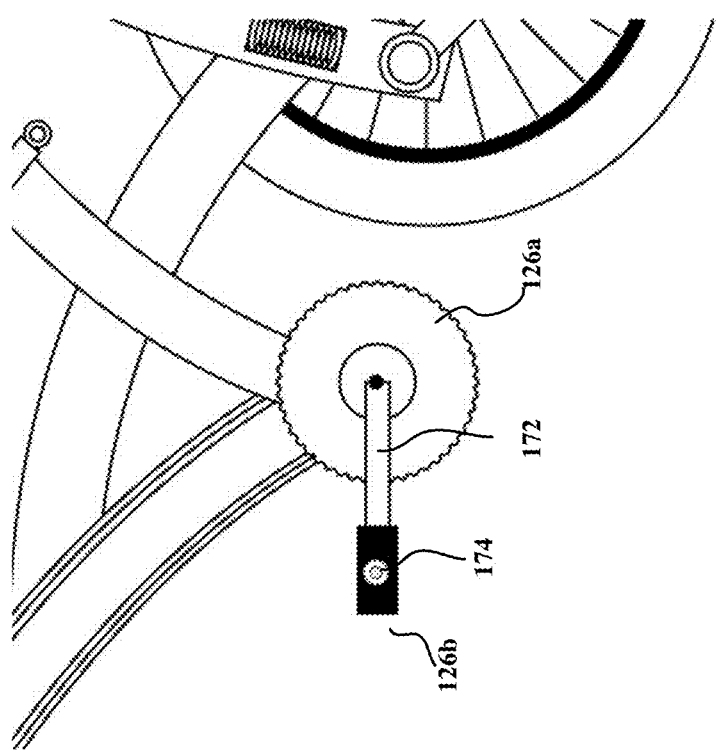

FIG. 1G provides side view 170, illustrating an alternative example of a pedal assembly 126b where a pair of bicycle pedals is adjustable. In some models of bicycle 100, the pair of bicycle pedals may be lockable through an internal locking component 174 that is housed within a crank component 172 of the pedal assembly 126b. The internal locking component 174 may be partially exposed to allow users to engage/disengage the locking mechanism. In alternative examples (e.g., shown in FIG. 5), the crank component 172 may be adapted to comprise locking pins and slots that can be engaged to lock a pair of pedals of the pedal assembly 126b in a fixed position. In one example, the locking mechanism may be engaged through a pressable button or switch, a quick-release component or configured to engage through a manual twisting action that is used to engage/disengage the locking mechanism.

Figure 1H:
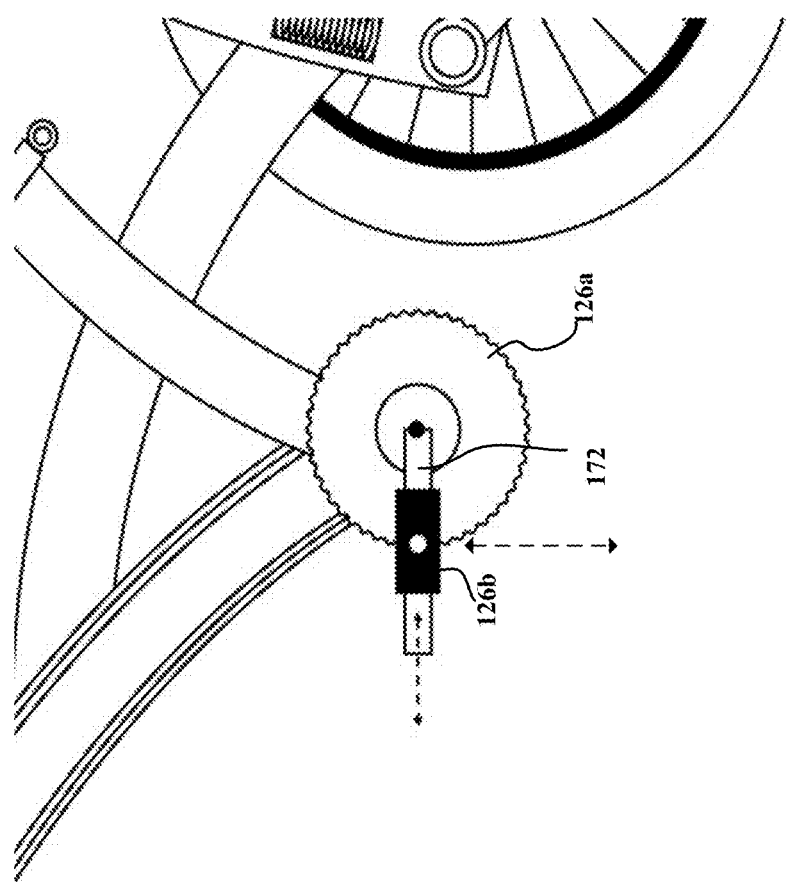
Figure 1I:
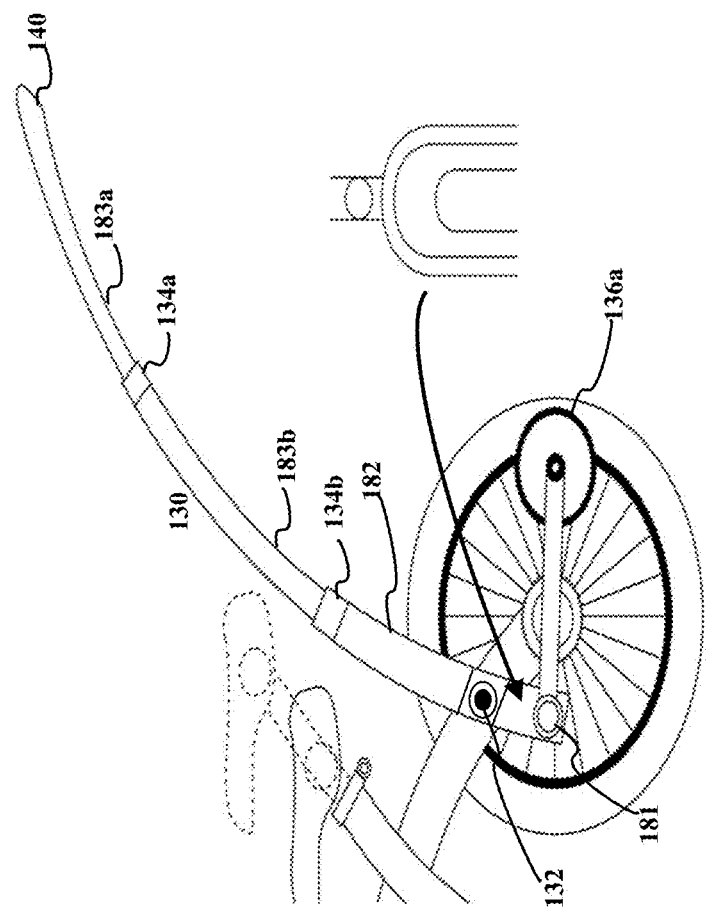
Figure 1J:
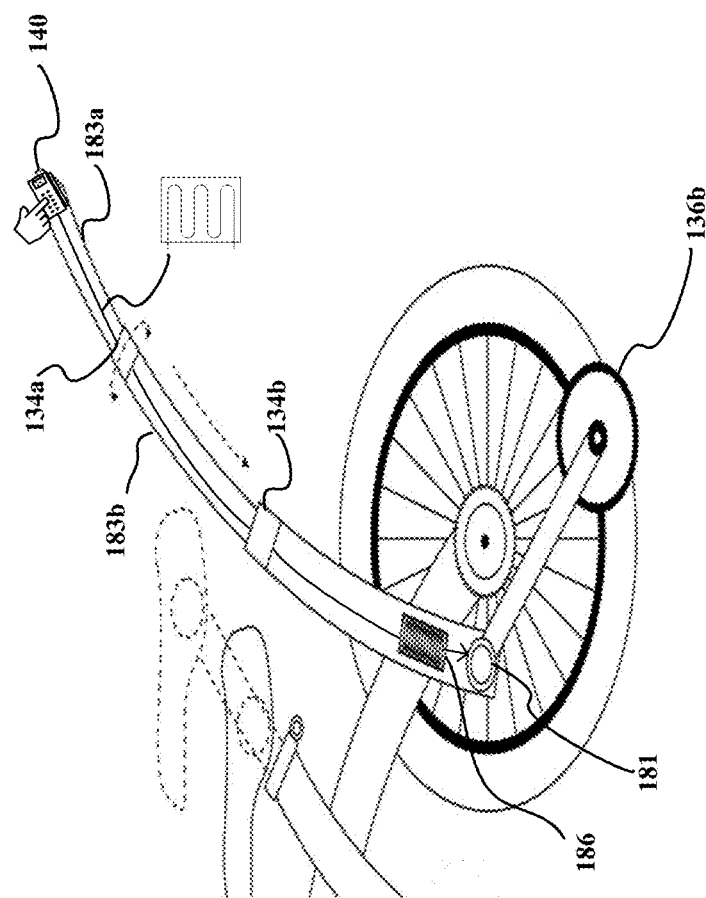
Figure 1K:
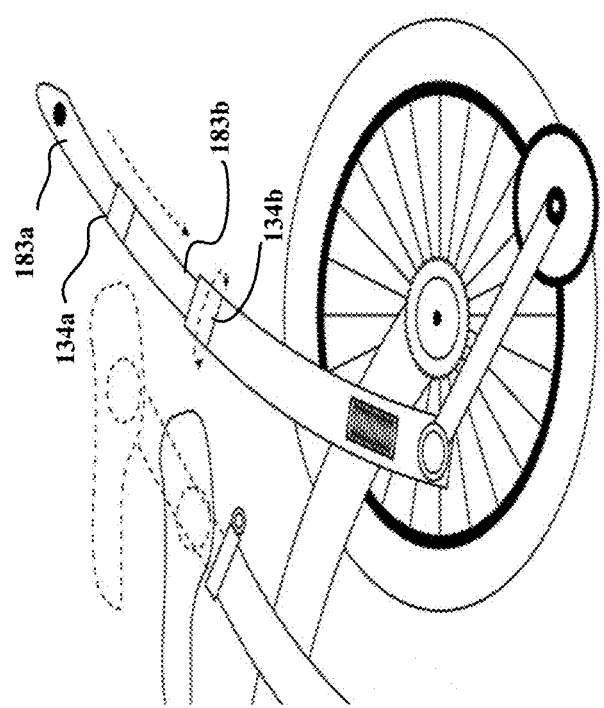

FIG. 1H provides side view 175, illustrating a continued example of adjustment of the pedal assembly 126b. As can be seen in side view 175 and highlighted through the arrows, the pair of bicycle pedals of the pedal assembly 126b may be adjusted in a forward or reverse position across a horizontal plane, where the pair of bicycle pedals 126b may be moved closer to the front assembly or away from the front assembly. In another example, the pair of pedals may be foldable to enable the bicycle to easily convert between a balance bike configuration and a pedal bike configuration. For instance, a pair of foldable pedals may be adjustable in either: a first pedal position having the pair of foldable pedals folded in an upright position for balance bike purposes or a second pedal position having the pair of folded pedals engaged in a horizontal position to enable usage of the pair of foldable pedals for pedaling purposes. Such utility may be enabled through connected of one of more additional components to the pedal assembly such as hinge, push-pin folding mechanism or the like as known to one skilled in the field of art. In non-limiting examples, the pair of pedals may be made of a plastic, alloy or composite material that are sturdy, rigid and also lightweight to enable child riders to easily manipulate the pedal positions.

FIG. 1I provides side view 180, illustrating a magnified view of training wheel device 130. Side view 180 highlights multiple different portions of an exemplary guide member of an exemplary training wheel device 130. In the example shown in side view 180, the guide member comprises a bottom portion 182, a top portion 183a and a middle portion 183b. The top portion 183a is a collapsible portion (e.g., telescoping), which interfaces with a telescoping joint 134a, enabling a trainer to quickly adjust the size of the top portion 183a of training wheel device 130. In some alternative examples, the top portion 183a may be fixed and not telescoping, where telescoping functionality of the guide member may be limited to a middle portion 183b of the guide member. An exemplary control device 140 may be connected at a distal end of top portion 183a. In the example shown in side view 180, the distal end of the top portion 183a is configured as a handle. Exemplary functionality of the training wheel device 130, as described in the foregoing description, may be configured with an exemplary handle of the training wheel device 130 including implementation of a control device 140 or individual control components for the described functionality. An exemplary handle may be engineered in any shape or form without departing from the spirit of the present disclosure.

The guide member may further comprise a middle portion 183b that enables additional extension of the guide member to maximize usability and comfort of the training wheel device 130 for a trainer. The middle portion 183b is attached to the top portion 183a and the bottom portion 182 of the guide member. Similar to the top portion 183a of the guide member, the middle portion 183b may be a collapsible portion (e.g., telescoping), which interfaces with a telescoping joint 134b, enabling a trainer to quickly adjust the size of the middle portion 183b of training wheel device 130. In examples, a collapsed portion of the guide member, including the top portion 183a and the middle portion 183b, may still have a small portion extending out therefrom to enable a trainer to grasp, unlock and raise a collapsed portion of the guide member. This may enable a trainer to adjust the extension of the training wheel device 130 to their own comfort level.

Moreover, the guide member may further comprise a bottom portion 182. An exemplary bottom portion 182 is attached to the middle portion 183b of the guide member and attachable with the bicycle frame of bicycle 100. As illustrated in side view 180, the bottom portion 182 of the guide member may be forked, where the bottom portion 182 attaches to the bicycle frame, via the bracket assembly 132, on two both sides of the top tube 124 (or seat stay). This may provide additional stability for the training wheel device 130 to connect with the bicycle frame, especially in instances where a trainer is pulling on or applying force to the training wheel device 130. As referenced in the foregoing description, the training wheel device 130 is attachable to a bicycle frame via a bracket assembly 132. The bracket assembly 132 may comprise components that are affixed to the bicycle frame (e.g., top tube 124 or seat stay). In some examples, the bottom portion 182 of the guide member may comprise one or more components of the bracket assembly 132 that enable interfacing between the training wheel device 130 and an exemplary bicycle frame that comprises other components of the bracket assembly 132.

The bottom portion 182 of the guide member further comprises an attachment component 181 that connects the set of training wheels 136 with the bottom portion 182 of the training wheel device. An exemplary attachment component 181 may comprise a bracket assembly or the like that interfaces with a spring configuration of the training wheel device 130 to enable deployment of the set of training wheels 136. Components for attachment of the set of training wheels 136 to the bottom portion 182 of the guide member are known to one skilled in the field of art. When an exemplary spring is not applying pressure to the bracket assembly, the set of training wheels 136 are in an elevated position 136a as shown in side view 180.

FIG. 1J provides side view 185, illustrating a continued example of an exemplary training wheel device 130. In the example shown in side view 185, the control device 140 may be utilized (e.g., a button being pressed) to engage the spring assembly. Engagement of the spring assembly comprises action where the spring assembly, through an exemplary spring 186, applies pressure to the attachment component 181 that connects the set of training wheels 136 with the bottom portion 182. When pressure is applied to attachment component 181, the set of training wheels 136 are deployed in an active position 136b, where the training wheels are engaged and usable for the rider. In one example, a trainer may hold a button of the control device 140 to keep the spring assembly engaged, where release of a button/lever etc., may result in the training wheels returning to the elevated position 136a shown in FIG. 1I. In another example, a button/lever, when pressed, may lock into place securing the set of training wheels 136 in the active position 136b. Re-pressing an exemplary button/lever of the control device 140 may release the tension applied to the spring 186 and return the training wheels 136 to the elevated position 136a.

Moreover, side view 180 illustrates (through arrows) adjustment functionality of the guide member and the telescoping/locking joints. As referenced in the foregoing description, an exemplary top portion 183a and an exemplary middle portion 183b may be adjustable (height-wise) when the telescoping joints, respectively 134a and 134b, are disengaged/unlocked. Telescoping joints 134a and 134b may be lockable/unlockable, through a twisting action or alternatively a clip lock mechanism or similar type of lock.

FIG. 1K provides side view 190, illustrating a continued example (of FIG. 1J) for adjustment of an exemplary guide member. As referenced in the foregoing description, the top portion 183a and the middle portion 183b of a guide member (for the training wheel device 130) may be adjusted in a height-wise manner. As seen in side view 190, the top portion 183a and the middle portion 183b are compressed as compared with side view 185 of FIG. 1J. A user may adjust the height of one or more of the top portion 183a and the middle portion 183b of the guide member to a desired position. To lock the respective guide members in the desired positioning, the user would then engage the telescoping joints 134a and 134b.

Figure 2B:
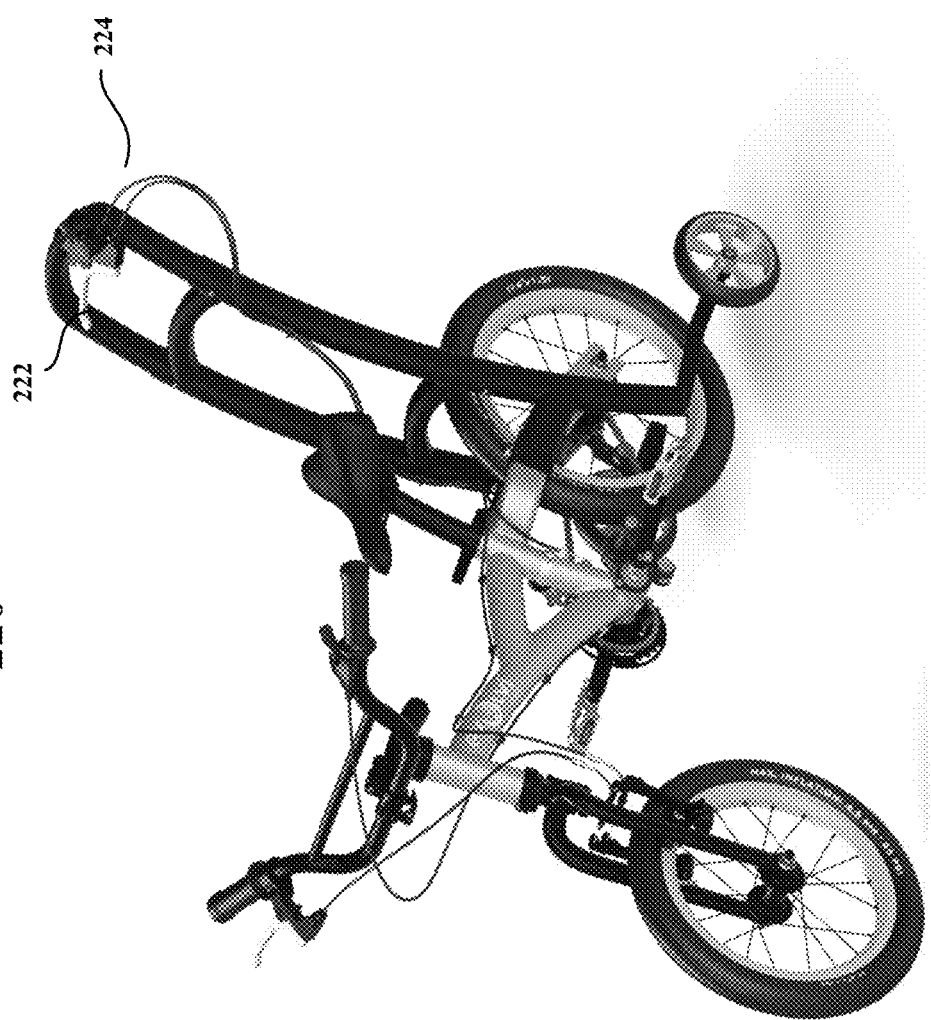

FIGS. 2A-2B illustrate side views of an exemplary bicycle with which aspects of the present disclosure may be practiced.

FIG. 2A provides side view 200, illustrating an exemplary bicycle of the present disclosure. Side view 200 provides a more visually-realistic view of an exemplary bicycle 100 (FIG. 1). However, it is to be understood that the representation of the bicycle shown in side view 200 is a non-limiting example of the present disclosure. Side view 200 further illustrates that the control device 140 of the attachable/detachable training wheel device 130 is connected with a brake line 202. The brake line 202 is connected with a brake (e.g., rear brake) of an exemplary bicycle. This configuration enable control over braking of the bicycle via the control device 140.

Moreover, side view 200 further comprises visual identification of a pair of hand brakes 204 that are attached to the handlebars of the bicycle. As referenced in the foregoing description, an exemplary bicycle (e.g., bicycle 100) may be configured to include one or more of hand brakes and coaster brakes. The hand brakes may be connected to one or more brake lines 208 connected with a front brake, a rear brake or a combination thereof. Additionally, the front of the bicycle, via a gear toggling component attached to the handlebars (not shown), may be configured to enable a user to control a gear assembly. The gear toggling component may be attached to one or more gear lines 206 of the bicycle to enable a rider to control switching of gears during operation of the bicycle. Furthermore, side view 200 provides a view of a headset 210 that interfaces with a head tube (e.g., head tube 102 as described in FIG. 1). As previously referenced, the headset 210 is configured to provide a rotational interface between a bicycle fork (e.g., front bicycle fork 104 of FIG. 1) and a head tube (head tube 102). As previously described, functionality of a headset 210 can be controlled to enable or restrict rotation based on operation of the front assembly locking component 106.

FIG. 2B provides side view 220, illustrating an exemplary bicycle of the present disclosure. Side view 220, like side view 200 (of FIG. 2A), provides a non-limiting visually-realistic view of an exemplary bicycle 100 (FIG. 1). Among other things, side view 220 further illustrates that a version of the attachable/detachable training wheel device 130 where a control device 222 is configured to connect with a gear line 224. The gear line 224 may be connected with a gear assembly of an exemplary bicycle. This configuration enable control over toggling between gears of the gear assembly via the control device 222 so that a user of the training wheel device can control gear shifting of the bicycle.

Figure 2C:
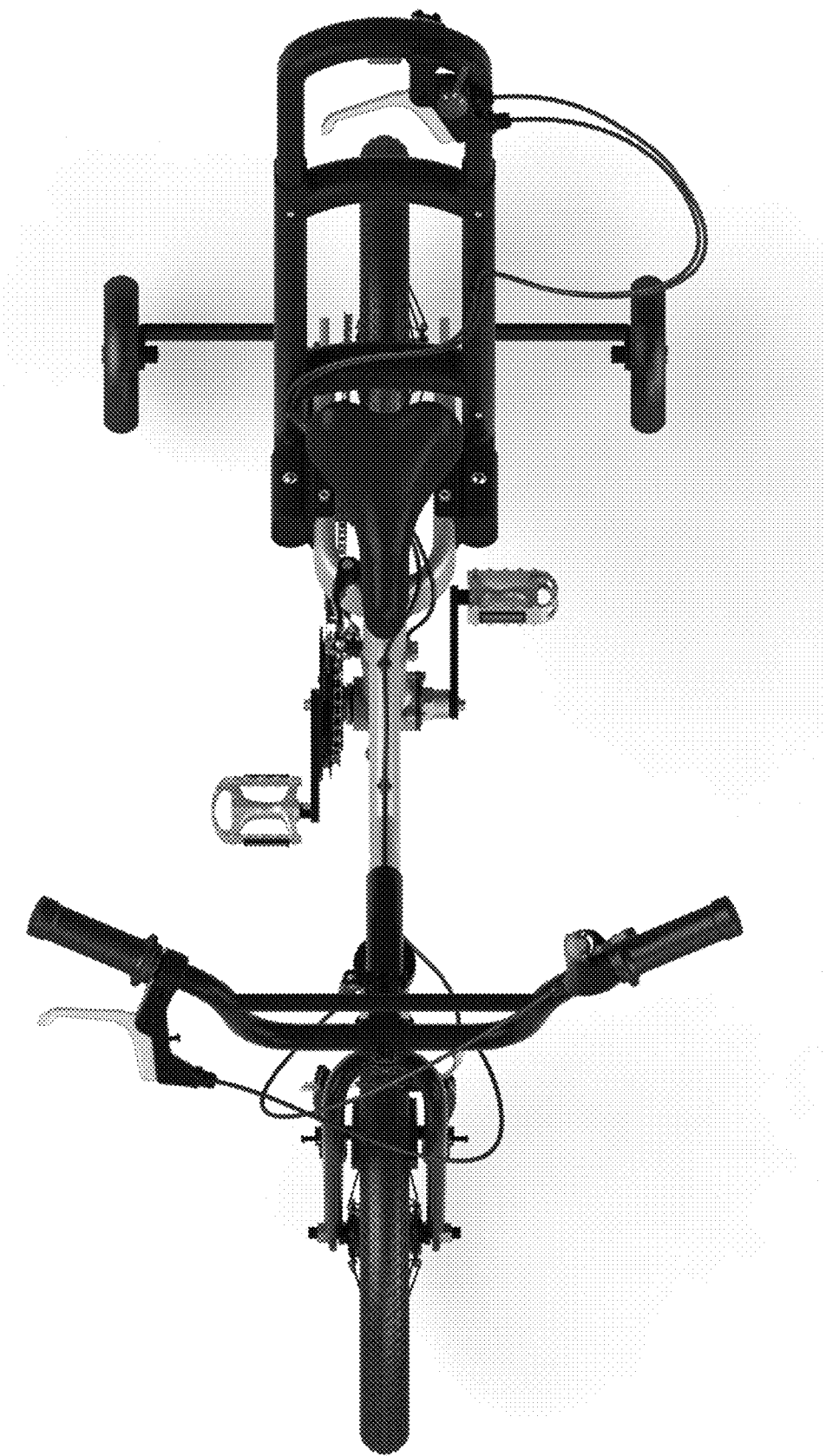
FIG. 2C illustrates a top view of an exemplary bicycle with which aspects of the present disclosure may be practiced.

FIG. 2C illustrates a top view 240 of an exemplary bicycle with which aspects of the present disclosure may be practiced. Side view 240, like side view 200 (of FIG. 2A) and side view 220 (of FIG. 2B), provides a non-limiting visually-realistic view of an exemplary bicycle 100 (FIG. 1). Top view 240 provides a visual representation illustrating how a training wheel device is attached to the rear of an exemplary bicycle as described herein.

Figure 4:
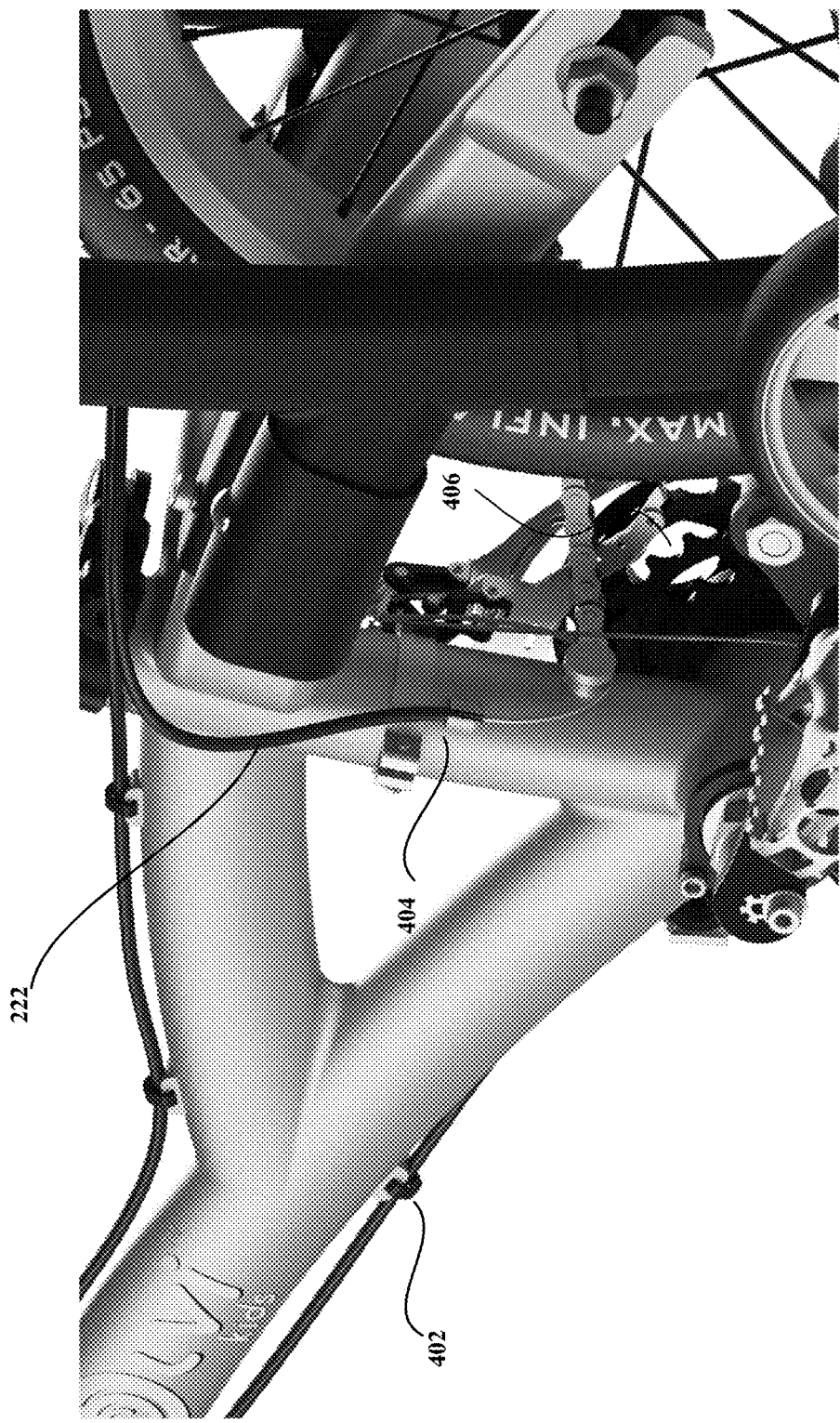

FIGS. 3-4 illustrate magnified size views of an exemplary bicycle to highlight exemplary components thereof with which aspects of the present disclosure may be practiced.

FIG. 3 illustrates side view 300 highlighting non-limiting examples of functionality for specific locking components of an exemplary bicycle described herein. In one example, side view 300 provides a semi-exploded view of interaction of a front assembly locking component 106 (e.g., quick-release locking component) that is configured to control locking of the front assembly of an exemplary bicycle frame. To enable such functionality, the front assembly locking component 106 comprises a locking engagement member 302 that extends through a portion of an inside of the head tube (e.g., head tube 102) and contacts a tension component 304 affixed inside the head tube. When the front assembly locking component 106 is engaged, the locking engagement member 302 interfaces with the tension component 304 (e.g., applying pressure) to restrict motion of the headset 210 thereby preventing 180-degree rotation of the front assembly. For instance, the locking engagement member 302 compresses the tension component 304 to applying pressure on the headset 210 so rotational motion is limited. When the front assembly locking component 106 is disengaged, the tension component 304 is decompressed within the head tube enabling full functionality of the headset 210 to achieve rotation including 180-degree rotation of the front assembly.

In further examples, side view 300 provides a semi-exploded view of interaction of a handlebar locking component 110 and an adjustable handlebar slot 114. The handlebar locking component 110, when engaged, may apply pressure to a tension component 308 that restricts movement of a pair of handlebars (e.g., handlebars 112 of FIG. 1) through the adjustable handlebar slot 114. When the handlebar locking component 110 is disengaged, the tension component 308 allows for movement of handlebars through the adjustable handlebar slot 114, where the handlebar locking component 110 can be re-engaged to lock the handlebars in a specific position with the adjustable handlebar slot 114.

FIG. 4 illustrates side view 400 highlighting non-limiting examples of functionality that supplements connection between an attachable/detachable training wheel device and an adapted bicycle as disclosed herein. Side view 400 illustrates cable guide components 402 and 404 that guide connection of a brake line and gear line, respectively, along the bicycle frame. An exemplary bicycle frame may comprise a plurality of cable guide components 402 and 404 that are engineered to help secure cable lines (e.g., brake and/or gear lines) so that respective cable lines are not a hazard during operation of an exemplary bicycle. The cable guide components 402 and 404 are emphasized because of the brake lines and/or gear lines may be manually manipulated at times to connect respective lines with the attachable/detachable training wheel device 130. Size, shape and design of the cable guide components may vary without departing from the spirit of the present disclosure. When lines are adjusted, users may utilize the cable guide components 402 to secure respective lines and prevent hazard. Cable guide component 404 may be specifically configured to secure a gear line that connects to a gear assembly 406. As described in the foregoing description, gear lines may be connected with attachable/detachable training wheel device 130 to enable gear toggling functionality though the attachable/detachable training wheel device 130. In some examples, the gear assembly 406 may be configured to have 2 or more gears. In one example where 2 gears are utilized, a first gear may be a normal gear for bicycle riding and the second gear may be a gear that is engageable to make it tougher to pedal, for example, when an operator of the attachable/detachable training wheel device 130 is required to enter a fast walk/light jog due to the pedaling speed of by the rider. However, it is to be appreciated that any number of gear configurations as known to one skilled in the field of art can be implemented for the bicycle of the present disclosure. In examples where more than two gears are included in the gear assembly, multiple chain tensioners may be utilized to enable proper chain functionality when switching between the gears of the gear assembly 406.

Figure 5:
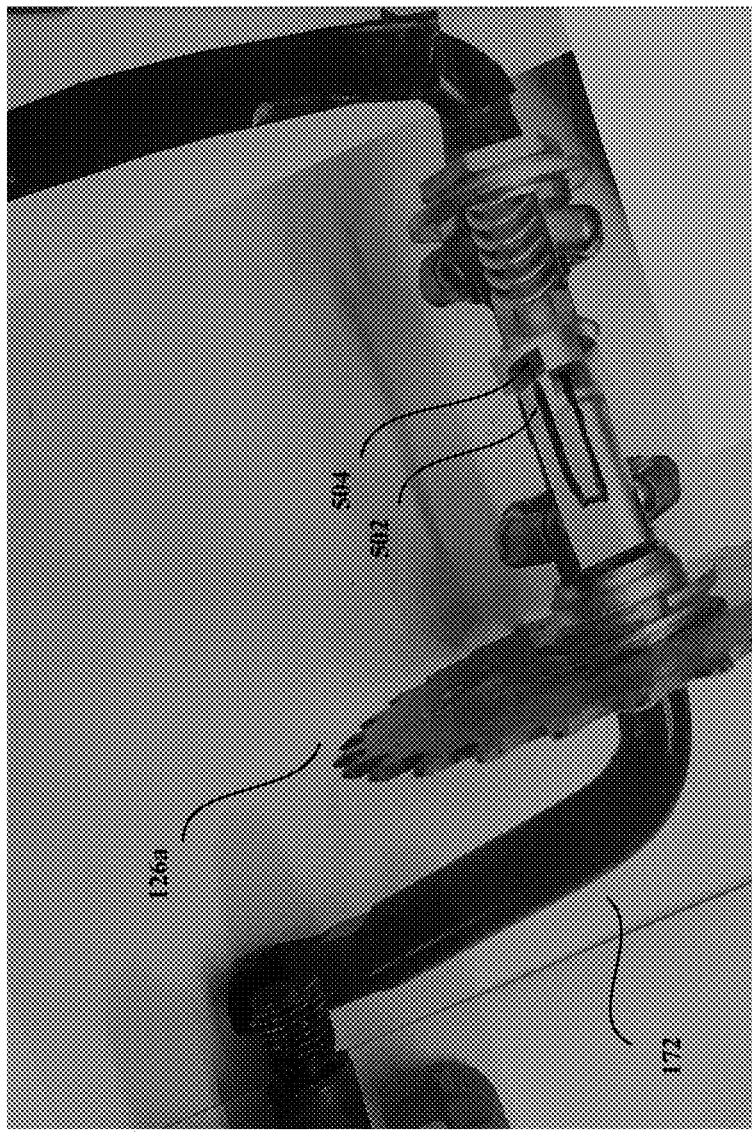
FIG. 5 illustrates non-limiting components of a modified pedal assembly with which aspects of the present disclosure may be practiced.

FIG. 5 illustrates non-limiting components of a modified pedal assembly with which aspects of the present disclosure may be practiced. Side view 500 illustrates a semi-explode view of a crank 172 (of a pedal assembly 126*b*) that is modified to enable the pedal assembly 126*b* to be locked for balance bike purposes. This may enable riders to utilize the pedals as footrests in a balance bike configuration. In one example, a modified crank 172 may be configured to engage/disengage a locking component of the crank through a twisting action that enables locking pins 502 to engage/disengage with customized locking slots 504 for locking of the pedal assembly. In one example, the arm of the crank 172 may be rotated to lock the pedal assembly in place. While this is one non-limiting example, it is to be understood that other mechanical components can be utilized to achieve the same functionality without departing from the spirit of the present disclosure. For instance, a quick-release locking component may be utilized to enable pedal to be fixed in a desired position.

Figure 6A:
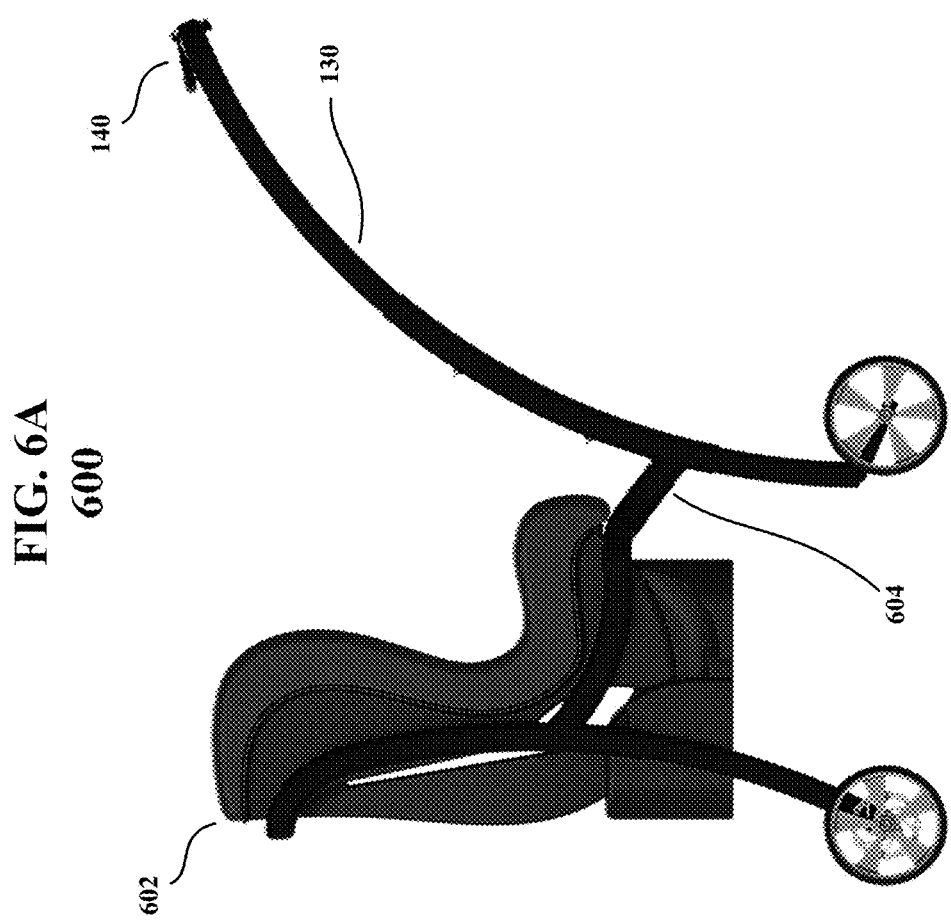
FIGS. 6A and 6B illustrate side views of a modified attachment device that is configured to connect with that is configured to be connected with a transportation device with wheels with which aspects of the present disclosure may be practiced.
Figure 6B:
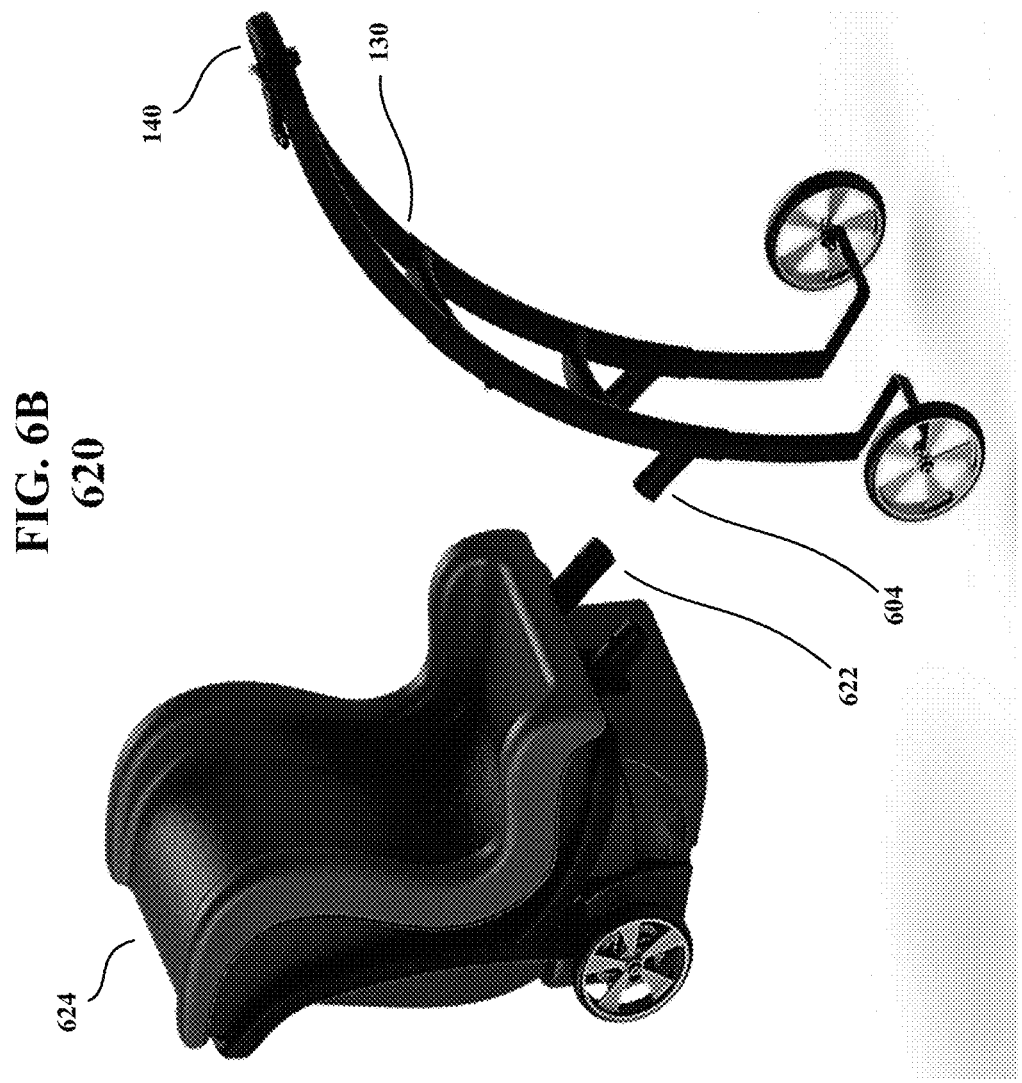

FIGS. 6A and 6B illustrate side views of a modified attachment device that is configured to connect with that is configured to be connected with a transportation device with wheels with which aspects of the present disclosure may be practiced. As referenced in the foregoing description, an attachable/detachable training wheel device may be modified to work with other wheeled transportation devices such as strollers, wheeled car seats or the like. In instances where the attachable/detachable training wheel device is utilized for a different purpose from a bicycle, the attachable/detachable training wheel device may be modified for the intended purpose.

FIG. 6A illustrates side view 600 where the attachable/detachable training wheel device 130 is connected with a wheeled car seat device 602. As can be seen in side view 600, the attachable/detachable training wheel device 130 is modified with a connection component 604 that may be configured to interface with the wheeled car seat device 602 to enable secure connection. In some examples, additional fastener components may be utilized to establish attachment of the wheeled car seat device 602 with the connection component 604 of the modified attachable/detachable training wheel device 130. In some examples, a wheeled car seat device 602 may be equipped with a braking attachment and/or gear assembly attachment, where the attachable/detachable training wheel device 130 can be physically attached to the wheeled car seat device 602 and the corresponding brake lines and/or gear lines connected with the control device 140.

FIG. 6B illustrates side view 620 illustrating connection between a wheeled car seat device 624 and a modified attachable/detachable training wheel device 130. In side view 620, the wheeled car seat device 624 is specifically engineered to attach to the connection component 604 of the modified attachable/detachable training wheel device 130 via connection interfaces 622 affixed to the wheeled car seat device 624. This enables a extra set of controllable wheels to be connected with the wheeled car seat device 624 to foster extra utility in various scenarios such as converting the wheeled car seat device 624 into a stroller with added functionality such as braking capability and gear adjustment (e.g., when a user is varying walking, jogging, running).

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A bicycle frame comprising:
a front assembly that comprises:
a front wheel fork;
a head tube that is attached to the front wheel fork, wherein the head tube comprises:
a headset, housed within the head tube, enabling rotation of the front assembly, wherein the headset enables rotation of the front assembly in a first position where the front wheel fork is forward-facing and a second position where the front wheel fork is backwards-facing; and
a quick-release locking component, attached to the head tube and connected with the headset of the head tube, that is engageable for locking rotation of the front assembly, wherein the quick-release locking component when engaged, locks the front assembly in one of the first position and the second position thereby preventing rotation of the front assembly to return to the other of the first position and the second position, and wherein the quick-release locking component, when disengaged, is configured to enable rotation of the front assembly, via the headset, between the first position and the second position.

2. The bicycle frame of claim 1, wherein the front assembly further comprises: a bicycle stem, extendable from a bottom portion of the head tube, that connects the front wheel fork to the head tube, wherein the bicycle stem is extendable when the quick-release locking component is disengaged.

3. The bicycle frame of claim 1, wherein the quick-release locking component further comprises a locking engagement member that extends through a portion of an inside of the head tube and contacts a tension component affixed inside the head tube, wherein when the quick-release locking component is engaged, the locking engagement member interfaces with the tension component to restrict motion of the headset preventing 180-degree rotation of the front assembly, and wherein when the quick-release locking component is disengaged, the tension component is decompressed enabling functionality of the headset including 180-degree rotation of the front assembly.

4. The bicycle frame of claim 1, further comprising:
an adjustable handlebar slot that is connected with the head tube and a pair of handlebars, wherein the adjustable handlebar slot provides a slot that enables the pair of handlebars to be slidably adjusted in a forward direction or a backward direction; and
a handlebar locking component, attached to the adjustable handlebar slot, that is engageable to lock the pair of handlebars in a position within the slot, and wherein the pair of handlebars are slidably adjustable in the forward direction or the backward directions when the handlebar locking component is disengaged.

5. The bicycle frame of claim 1, further comprising: a base assembly that comprises a down tube that is attached to the head tube, and a seat tube that is attached to the down tube, and wherein the down tube and seat tube are aligned in a configuration where the down tube and the seat tube are each curved in opposition away from each other.

6. The bicycle frame of claim 5, wherein the base assembly further comprises a top tube attached to the down tube and seat tube, wherein the top tube is curved and extends outwardly from the down tube towards the rear of the bicycle frame, and wherein a portion of the top tube extends outwardly, at an angle, from the seat tube.

7. The bicycle frame of claim 6, wherein the top tube extends from a middle portion of the down tube through a middle portion of the seat tube.

8. The bicycle frame of claim 6, wherein the portion of the top tube, extending outwardly from the seat tube, comprises a bracket assembly for attachment of an accessory device to the bicycle frame.

9. The bicycle frame of claim 8, further comprising: a detachable training wheel device attached to the top tube, via the bracket assembly, wherein the detachable training wheel device comprises a pair of deployable training wheels that are connected to a control device through a guide member, and wherein the guide member is telescoping and comprises one or more telescoping joints to lock the guide member at different lengths.

10. The bicycle frame of claim 9, further comprising: a gear assembly that comprises two or more gears, wherein the detachable training wheel device comprises a control member, configurable to connect with gear lines of the two or more gears, to enable control of the gear assembly through the control member.

11. The bicycle frame of claim 1, further comprising: a pedal assembly that comprises a pair of pedals, a crank and a locking component configured to lock the pair of pedals in a fixed position.

12. The bicycle frame of claim 1, further comprising: a pedal assembly that comprises a pair of foldable pedals connected to a crank, wherein the pair of foldable pedals are adjustable in either: a first pedal position having the pair of foldable pedals folded in an upright position for balance bike purposes or a second pedal position having the pair of folded pedals engaged in a horizontal position to enable usage of the pair of foldable pedals for pedaling purposes.

13. A bicycle comprising:
a bicycle frame that comprises:
a front assembly comprising:
a front wheel fork,
a head tube that is attached to the front wheel fork, wherein the head tube comprises:
a headset, housed within the head tube, enabling rotation of the front assembly, wherein the headset enables rotation of the front assembly in a first position where the front wheel fork is forward-facing and a second position where the front wheel fork is backwards-facing, and
a quick-release locking component, attached to the head tube and connected with the headset of the head tube, that is engageable for locking rotation of the front assembly, wherein the quick-release locking component when engaged, locks the front assembly in one of the first position and the second position thereby preventing rotation of the front assembly to return to the other of the first position and the second position, and wherein the quick-release locking component, when disengaged, is configured to enable rotation of the front assembly, via the headset, between the first position and the second position;

an adjustable handlebar slot that is connected with the head tube and a pair of handlebars, wherein the adjustable handlebar slot provides a slot that enables the pair of handlebars to be slidably adjusted in a forward direction or a backward direction; and a handlebar locking component, attached to the adjustable handlebar slot, that is engageable to lock the pair of handlebars in a position within the slot, and wherein the pair of handlebars are slidably adjustable in the forward direction or the backward directions when the handlebar locking component is disengaged; and a base assembly that comprises a down tube that is attached to the head tube, and a seat tube that is attached to the down tube, and wherein the down tube and seat tube are aligned in a configuration where the down tube and the seat tube are each curved in opposition away from each other.

14. The bicycle of claim 13, wherein the front assembly further comprises: a bicycle stem, extendable from a bottom portion of the head tube, that connects the front wheel fork to the head tube, wherein the bicycle stem is extendable when the quick-release locking component is disengaged.

15. The bicycle of claim 13, wherein the quick-release locking component further comprises a locking engagement member that extends through a portion of an inside of the head tube and contacts a tension component affixed inside the head tube, wherein when the quick-release locking component is engaged, the locking engagement member interfaces with the tension component to restrict motion of the headset preventing 180-degree rotation of the front assembly, and wherein when the quick-release locking component is disengaged, the tension component is decompressed enabling functionality of the headset including 180-degree rotation of the front assembly.

16. The bicycle of claim 13, wherein the base assembly further comprises a top tube attached to the down tube and seat tube, wherein the top tube is curved and extends outwardly from the down tube towards the rear of the bicycle frame, wherein the top tube extends from a middle portion of the down tube through a middle portion of the seat tube, and wherein a portion of the top tube extends outwardly, at an angle, from the seat tube and comprises a bracket assembly for attachment of an accessory device to the bicycle frame.

17. The bicycle of claim 16, further comprising: a detachable training wheel device attached to the top tube, via the bracket assembly, wherein the detachable training wheel device comprises a pair of deployable training wheels that are connected to a control device through a guide member, and wherein the guide member is telescoping and comprises one or more telescoping joints to lock the guide member at different lengths.

18. The bicycle of claim 13, further comprising: a gear assembly that comprises two or more gears, wherein the detachable training wheel device comprises a control member, configurable to connect with gear lines of the two or more gears, to enable control of the gear assembly through the control member.

19. The bicycle of claim 13, further comprising: a pedal assembly that comprises a pair of pedals, a crank and a locking component configured to lock the pair of pedals in a fixed position.

20. The bicycle of claim 13, further comprising: a pedal assembly that comprises a pair of foldable pedals connected to a crank, wherein the pair of foldable pedals are adjustable in either: a first pedal position having the pair of foldable pedals folded in an upright position for balance bike purposes or a second pedal position having the pair of folded pedals engaged in a horizontal position to enable usage of the pair of foldable pedals for pedaling purposes.

* * * * *